(12) United States Patent
Kitamura et al.

(10) Patent No.: US 11,935,559 B2
(45) Date of Patent: Mar. 19, 2024

(54) MAGNETIC DISK DEVICE

(71) Applicants: UACJ CORPORATION, Tokyo (JP); FURUKAWA ELECTRIC CO., LTD., Tokyo (JP)

(72) Inventors: Naoki Kitamura, Tokyo (JP); Kotaro Kitawaki, Tokyo (JP); Hideyuki Hatakeyama, Tokyo (JP); Ryohei Yamada, Tokyo (JP); Toshihiro Nakamura, Tokyo (JP)

(73) Assignees: UACJ CORPORATION, Tokyo (JP); FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/252,076

(22) PCT Filed: Nov. 11, 2021

(86) PCT No.: PCT/JP2021/041570
§ 371 (c)(1),
(2) Date: May 8, 2023

(87) PCT Pub. No.: WO2022/107680
PCT Pub. Date: May 27, 2022

(65) Prior Publication Data
US 2024/0005958 A1     Jan. 4, 2024

(30) Foreign Application Priority Data

Nov. 19, 2020   (JP) .................. 2020-192623

(51) Int. Cl.
*G11B 17/038*     (2006.01)
*G11B 5/02*       (2006.01)
*G11B 5/00*       (2006.01)

(52) U.S. Cl.
CPC .............. *G11B 17/038* (2013.01); *G11B 5/02* (2013.01); *G11B 2005/0021* (2013.01); *G11B 2005/0024* (2013.01)

(58) Field of Classification Search
CPC . G11B 17/038; G11B 5/02; G11B 2005/0021; G11B 2005/0024
See application file for complete search history.

(56) References Cited

U.S. PATENT DOCUMENTS

| | | | |
|---|---|---|---|
| 7,234,227 B1* | 6/2007 | Mallary | G11B 17/038 29/603.03 |
| 2005/0135225 A1* | 6/2005 | Feliss | G11B 17/038 369/127 |

(Continued)

FOREIGN PATENT DOCUMENTS

| | | |
|---|---|---|
| JP | 2001307452 A | 11/2001 |
| JP | 2010067324 A | 3/2010 |

(Continued)

OTHER PUBLICATIONS

Office Action issued in corresponding Japanese patent application No. 2020-192623, dated Jun. 22, 2021.

(Continued)

*Primary Examiner* — Andrew Sasinowski
(74) *Attorney, Agent, or Firm* — Greer Burns & Crain Ltd.

(57) ABSTRACT

This magnetic disk device is a 3.5-inch magnetic disk device equipped with magnetic disks formed from an aluminum alloy substrate. The magnetic disks arranged in a stacked manner have a thickness Td of 0.3 mm to 0.6 mm, the number N of magnetic disks involved is 10 to 16, and spacers disposed between the magnetic disks have an outside diameter 2 Rso of 35 mm to 65 mm. The outside (Continued)

diameter 2 Rso (mm) of the spacers satisfies $2\ Rso \geq -60\ Td+70$ and $2\ Rso \leq -0.5\ N^2-+16.5\ N-73$.

8 Claims, 8 Drawing Sheets

(56) References Cited

U.S. PATENT DOCUMENTS

| | | | | |
|---|---|---|---|---|
| 2011/0128651 | A1* | 6/2011 | Hayakawa | G11B 17/038 |
| 2016/0180867 | A1* | 6/2016 | Takagishi | G11B 5/09 |
| | | | | 360/123.01 |
| 2020/0227087 | A1 | 7/2020 | Eda et al. | |
| 2020/0234731 | A1 | 7/2020 | Takano | |
| 2023/0352048 | A1* | 11/2023 | McNab | G11B 19/2009 |

FOREIGN PATENT DOCUMENTS

| | | |
|---|---|---|
| JP | 2017199442 A | 11/2017 |
| JP | 6351780 B1 | 7/2018 |
| JP | 6505960 B1 | 4/2019 |
| WO | 2019151459 A1 | 8/2019 |

OTHER PUBLICATIONS

ISR issued in PCT/JP2021/041570, mailed Jan. 25, 2022.
JSME Mechanical Engineers' Handbook, vol. 4; Material Mechanics, Chapter 5 Plate, Table 36-18.
JSME Mechanical Engineers' Handbook, vol. 3; Mechanics, Chapter 2, Center of Gravity and Inertia Moment, Section 2-2-5-e Hollow Right Circular Cylinder.
Written opinion of the ISA, mailed Jan. 25, 2022.

* cited by examiner

BENDING AMOUNT AT OUTERMOST PERIPHERAL POSITION OF MAGNETIC DISK

DATA SPACE IN HARD DISK DRIVE

MAGNETIC DISK DEVICE

TECHNICAL FIELD

The present disclosure relates to a hard disk drive.

BACKGROUND ART

As smartphones and smart home appliances have become widely used, the amount of data that individuals use has increased. Such a vast amount of data are stored in hard disk drives (HDDs) in data centers via the Internet. In order to record a vast amount of data, a hard disk drive is expected to achieve higher capacity.

Examples of a technology to achieve higher capacity of a hard disk drive include a technological trend to increase the number of magnetic disks mounted on a hard disk drive and thereby increase data space per hard disk drive. In order to mount a plurality of magnetic disks on a hard disk drive, ring-shaped spacers are arranged between magnetic disks. The spacers also fulfill a role of maintaining distance between substrates constant in the case of using a plurality of substrates. For example, Patent Literature 1 discloses a glass spacer in which average surface roughness of a portion coming into contact with a magnetic disk is 0.001 to 0.3 m.

CITATION LIST

Patent Literature

Patent Literature 1: Unexamined Japanese Patent Application Publication No. 2001-307452

SUMMARY OF INVENTION

Technical Problem

Since dimensions of a hard disk drive are defined by standards, some measure, such as thinning the thickness of each magnetic disk, needs to be taken to increase the number of magnetic disks to be mounted on the hard disk drive. When the thickness of each magnetic disk is thinned, there are problems in that the rigidity of the magnetic disk decreases and the impact resistance and fluttering resistance deteriorate. That is, achievement of higher capacity of a hard disk drive and the impact resistance and fluttering resistance of the hard disk drive are in a dilemmatic relationship.

The present disclosure has been made in consideration of the above-described situation, and an objective of the present disclosure is to provide a hard disk drive that has excellent the impact resistance and fluttering resistance and in which data space in the hard disk drive is large.

Solution to Problem

In order to achieve the above-described objective, a hard disk drive according to a first aspect of the present disclosure is a 3.5-inch hard disk drive on which a magnetic disk formed of an aluminum alloy substrate is mounted, in which a thickness Td of each of magnetic disks that are arranged in a stacked manner is 0.3 mm or more and 0.6 mm or less, a number N of the magnetic disks is 10 or more and 16 or less, and an outer diameter 2Rso of a spacer that is arranged between the magnetic disks is 35 mm or more and 65 mm or less, and the outer diameter 2Rso (mm) of the spacer satisfies $2Rso \geq 60Td+70$ and $2Rso \leq -0.5N^2+16.5N-73$.

In the hard disk drive described above, the thickness Td of the magnetic disk is preferably 0.47 mm or more and 0.55 mm or less, the number N of the magnetic disks is preferably 10, the outer diameter 2Rso of the spacer is preferably 38 mm or more and 42 mm or less, the thickness of the spacer is preferably 1.5 mm or more, and the hard disk drive preferably excels in low power consumption at starting.

In order to achieve the above-described objective, a hard disk drive according to a second aspect of the present disclosure is a 3.5-inch hard disk drive on which a magnetic disk formed of a glass substrate is mounted, in which a thickness Td of each of magnetic disks that are arranged in a stacked manner is 0.3 mm or more and 0.6 mm or less, a number N of the magnetic disks is 10 or more and 16 or less, and an outer diameter 2Rso of a spacer that is arranged between the magnetic disks is 35 mm or more and 65 mm or less, and the thickness Td of the magnetic disk is 0.3 mm or more and 0.49 mm or less, and the outer diameter 2Rso (mm) of the spacer satisfies $2Rso \geq -74Td+69.3$ and $2Rso \leq -0.42N^2+14.8N-63.1$.

In the hard disk drive described above, the thickness Td of the magnetic disk is preferably 0.37 mm or more and 0.41 mm or less, the number N of the magnetic disks is preferably 10, the outer diameter 2Rso of the spacer is preferably 39 mm or more and 42 mm or less, the thickness of the spacer is preferably 1.6 mm or more, and the hard disk drive preferably excels in low power consumption at starting.

The hard disk drive described above preferably performs recording by heat assisted magnetic recording or microwave assisted magnetic recording.

Advantageous Effects of Invention

The present disclosure enables a hard disk drive that has excellent impact resistance and fluttering resistance and in which data space in the hard disk drive is large to be provided.

DESCRIPTION OF EMBODIMENTS

A hard disk drive (HDD) and a spacer of an embodiment of the present disclosure are described below with reference to the drawings.

Figure 1A:
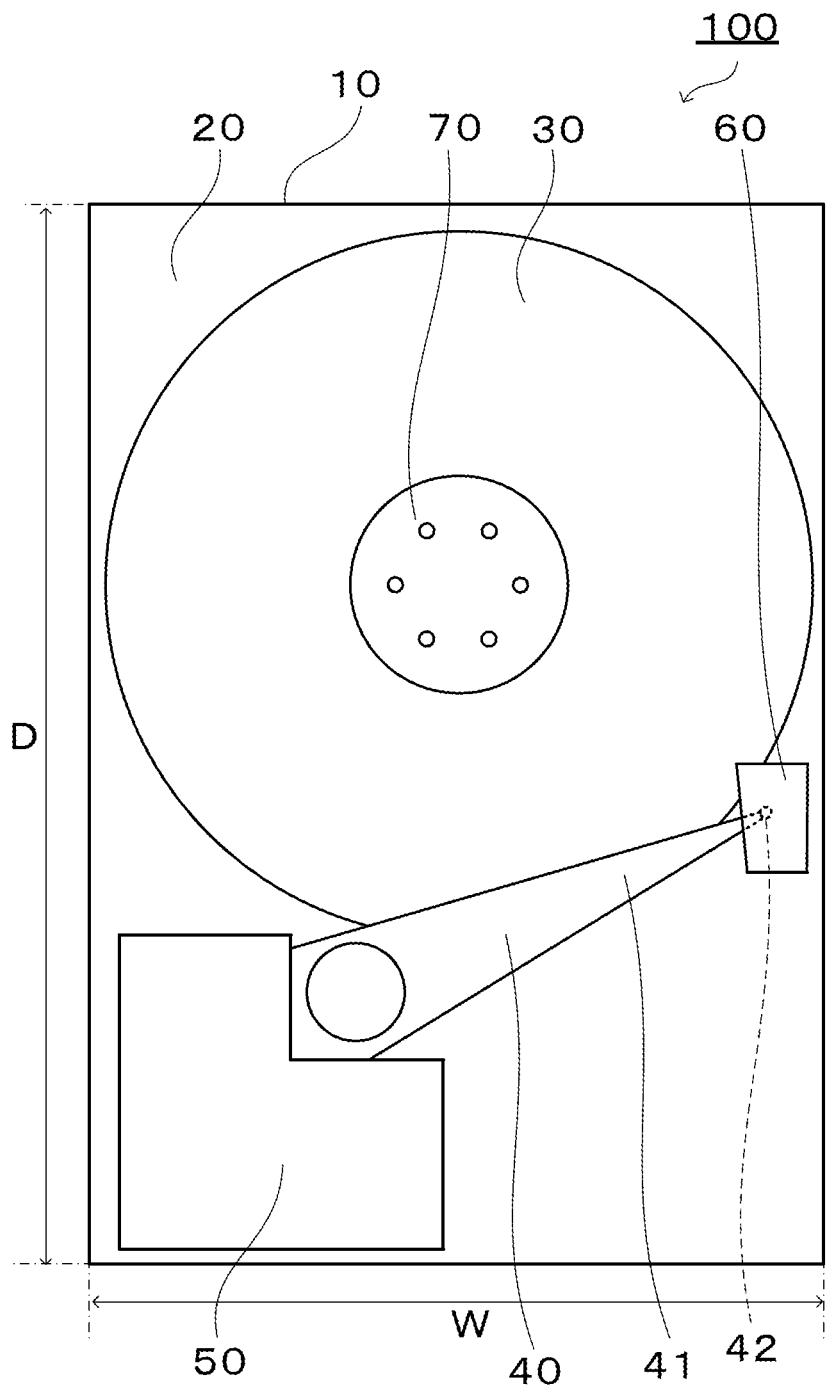
FIG. 1A is a top view illustrating a hard disk drive according to an embodiment.
Figure 1B:
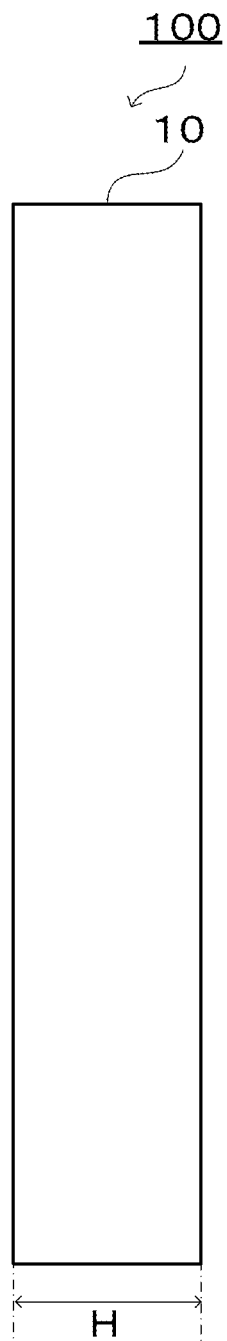
FIG. 1B is a side view illustrating the hard disk drive.
Figure 2:
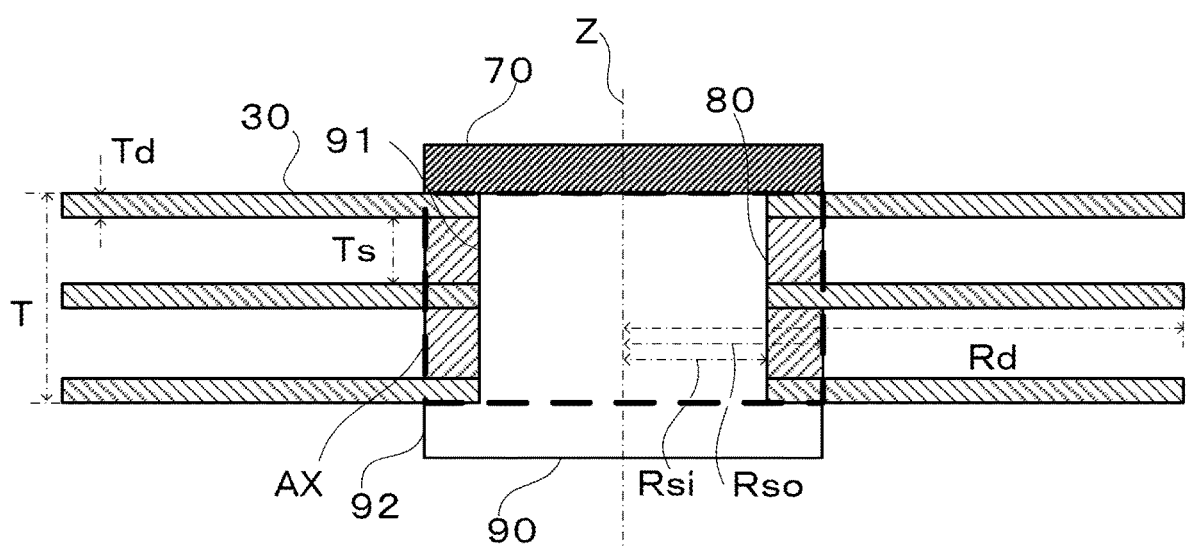
FIG. 2 is a cross-sectional view illustrating substrates for magnetic disks and spacers that the hard disk drive according to the embodiment includes.
Figure 3:
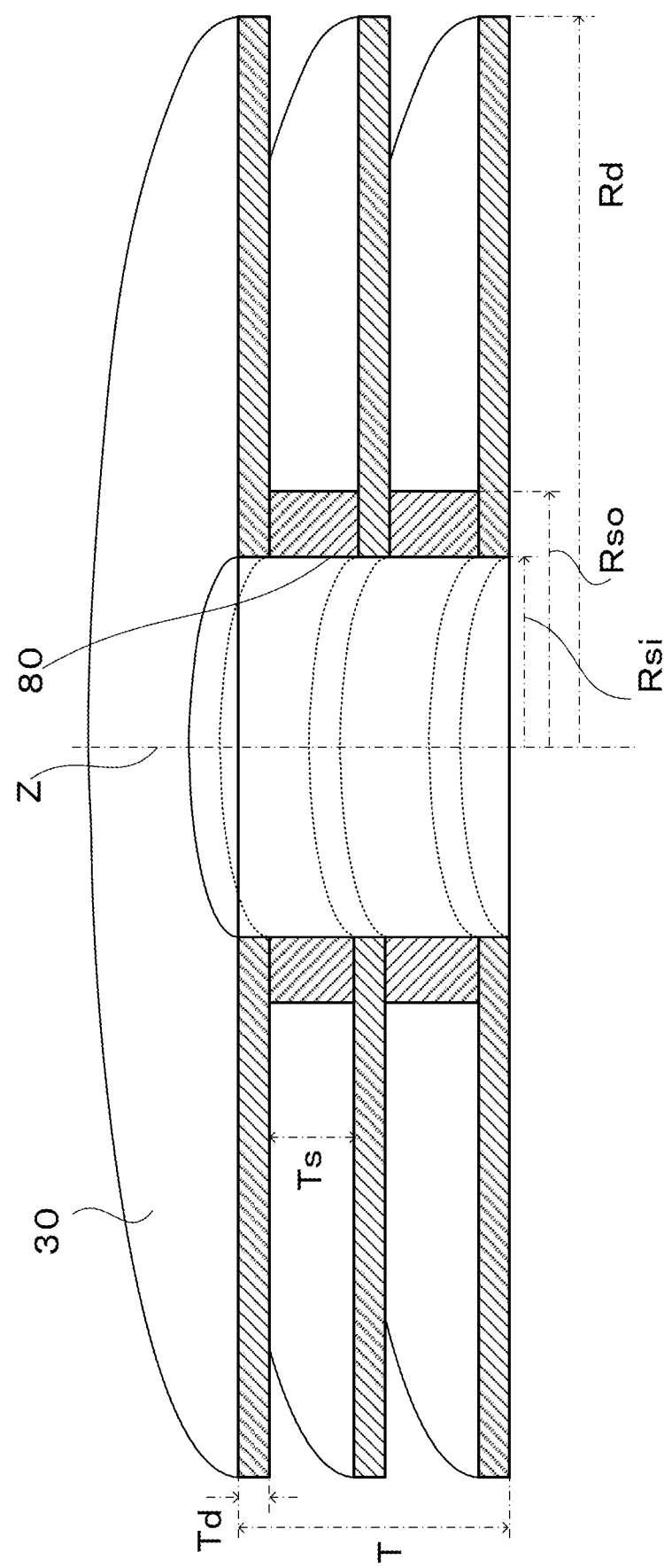
FIG. 3 is a perspective view illustrating the substrates for magnetic disks and the spacers that the hard disk drive according to the embodiment includes.

A hard disk drive 100 of the present embodiment is a box-shaped recording/reproduction device and includes, as illustrated in FIGS. 1A and 1B, a housing 10, a base 20, a plurality of magnetic disks 30 arranged in a stacked manner, a head stack assembly 40, a voice coil motor 50, a ramp load 60, a clamp 70, and not-illustrated required members, such as a spindle motor and a circuit board. The hard disk drive 100 also includes, as illustrated in FIGS. 2 and 3, a plurality of spacers 80 arranged between the plurality of magnetic disks 30 and a hub 90 to rotate the plurality of magnetic disks 30 about a rotational axis Z.

Returning to FIG. 1, dimensions of the hard disk drive 100 are defined in an industry standard, and, for example, 3.5-inch hard disk drives having dimensions conforming to the specification SFF-8301 are suitably used for data centers. In this specification, height H, width W, and depth D of the housing 10 are defined as 26.1 mm, 101.6 mm, and 147 mm, respectively.

The housing 10 is generally formed of metal, has a cubic box shape one face of which is opened, and hermetically seals the base 20, the magnetic disks 30, the head stack assembly 40, the voice coil motor 50, the ramp load 60, the clamp 70, and the required members, such as the spindle motor and the circuit board, by a not-illustrated top cover.

The base 20 is a component that is arranged at the bottom of the housing 10 and on which the voice coil motor 50, the spindle motor, the circuit board, and the like are mounted. The base 20 and the housing 10 are often formed in an integrated form.

Each of the magnetic disks 30 is, as illustrated in FIGS. 2 and 3, a disk-shaped medium for magnetically recording information, is composed of a substrate, a base layer, a magnetic layer, a protective layer, and a lubricant layer, and rotates about the rotational axis Z. As a magnetic recording method, perpendicular magnetic recording (PMR) or shingled magnetic recording (SMR) is suitably used. In order to achieve higher capacity, technologies such as heat assisted magnetic recording (HAMR) and microwave assisted magnetic recording (MAMR) have been developed. As the substrate, an aluminum alloy substrate or a glass substrate is suitably used. Details of an aluminum alloy substrate and a glass substrate are described later.

A thickness Td, an outer diameter 2Rd, and an inner diameter of each magnetic disk 30 are 0.3 mm or more and 0.6 mm or less, 95 mm or 97 mm, and 25 mm, respectively. In addition, the number N of magnetic disks 30 that the hard disk drive 100 of the present embodiment includes is 10 or more and 16 or less. When each magnetic disk 30 is formed of a glass substrate, the thickness Td of the magnetic disk 30 is preferably 0.3 mm or more and 0.49 mm or less. Examples of technologies to achieve higher capacity of the hard disk drive 100 include a technology to increase the number of magnetic disks 30 mounted on the hard disk drive 100 and thereby increase data space per hard disk drive 100. However, since the dimensions of the hard disk drive 100 are defined in the industry standard as described afore, there is a limit to a space for installing the magnetic disks 30. Therefore, in order to increase the number of magnetic disks 30 to be mounted on the hard disk drive 100, the thickness of each magnetic disk 30 is thinned.

Returning to FIG. 1, the head stack assembly 40 includes an arm 41 and a head 42 attached to the tip of the arm 41. When recording is performed by HAMR, a laser element is mounted on the head 42, and, when recording is performed by MAMR, a microwave generating element is mounted on the head 42.

The voice coil motor 50 is a drive motor to rotate the head stack assembly 40.

The ramp load 60 is a component made of resin and is mounted at a position that is closest to the magnetic disks 30 on the outer peripheral portion side of the magnetic disks 30 for the purpose of causing the head 42 to retreat thereto at the time when the hard disk drive 100 is not in operation.

The clamp 70 is a component to fix the magnetic disks 30 to the hub 90.

As illustrated in FIGS. 2 and 3, the spacers 80 are ring-shaped thin plates and are arranged between the plurality of magnetic disks 30. The spacers 80 being arranged between the plurality of magnetic disks 30 causes the magnetic disks 30 to be firmly fixed to the hub 90 of the spindle motor by the clamp 70. Roles of the spacers 80 are to secure gaps between the plurality of magnetic disks 30 and to transmit rotational driving force of the hub 90 to the magnetic disks 30 that are not in direct contact with the hub 90 or the clamp 70 by coming into contact with and adhering to the magnetic disks 30.

An outer diameter 2Rso of each of the spacers 80 is 35 mm or more and 65 mm or less. Because of this configuration, it is possible to increase the data space in the hard disk drive 100 while maintaining the impact resistance and fluttering resistance of the hard disk drive 100. The impact resistance and the fluttering resistance are described later. When the hard disk drive 100 has the magnetic disks 30 that are formed of aluminum alloy substrates mounted thereon, the outer diameter 2Rso (mm) of each spacer 80 preferably satisfies $2Rso \geq -60Td+70$ and $2Rso \leq -0.5N^2+16.5N-73$. When the hard disk drive 100 has the magnetic disks 30 that are formed of glass substrates mounted thereon, the outer diameter 2Rso (mm) of each spacer 80 preferably satisfies $2Rso \geq -74Td+69.3$ and $2Rso \leq -0.42N^2+14.8N-63.1$.

With regard to the thickness Ts of each spacer 80, although the gaps between the magnetic disks 30 are preferably as narrow as possible because the narrower the gaps become, the more magnetic disks 30 can be mounted in a limited space, spaces in which the head stack assembly 40 is to be operated are necessary above surfaces of the magnetic disks 30. In particular, in HAMR and MAMR, which are afore-described technologies to achieve higher capacity, when recording is performed by HAMR, a laser element is required to be mounted on the head 42 and, when recording is performed by MAMR, a microwave generating element is required to be mounted on the head 42, and miniaturization of the head stack assembly 40 is thus not easy to achieve. Each of the gaps between the magnetic disks 30, that is, the thickness Ts of each spacer, is required to be at least 1 mm or more, preferably 1.5 mm, and more preferably 1.6 mm or more.

Figure 4:
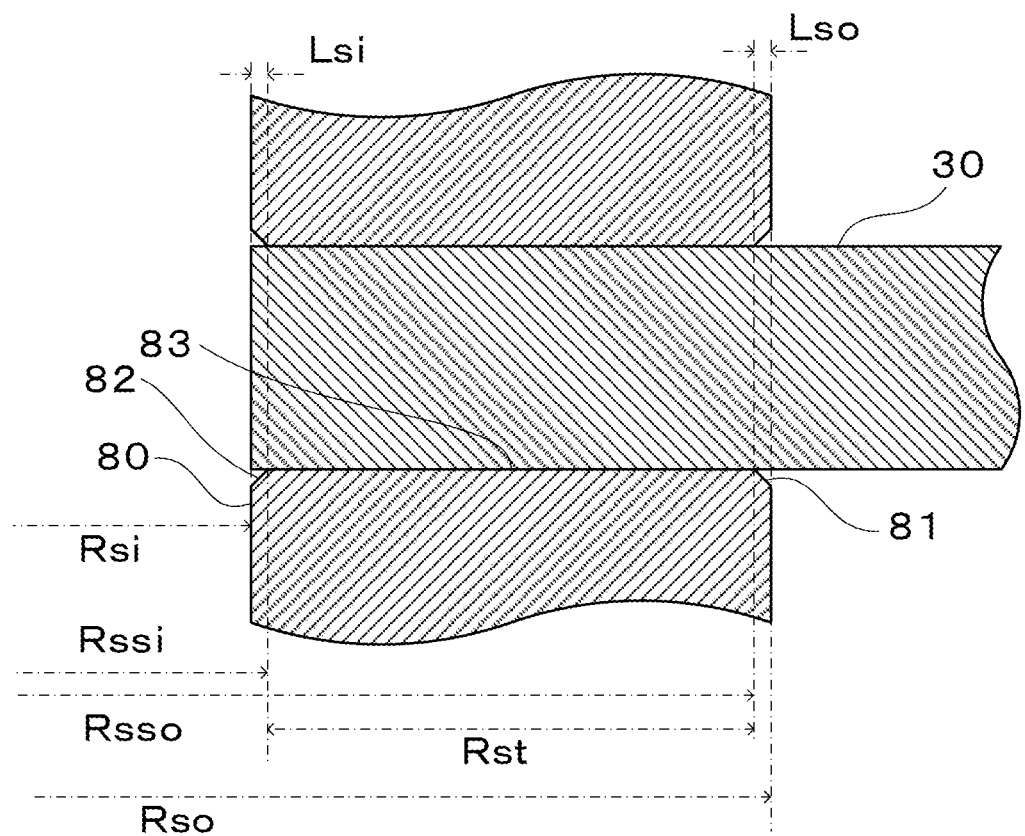
FIG. 4 is an enlarged cross-sectional view illustrating a substrate for a magnetic disk and spacers that the hard disk drive according to the embodiment includes.

Each spacer 80 desirably has such a shape that flatness of both surfaces of the spacer 80 is small. Further, boundaries between the front and back surfaces and the inner and outer peripheral end surfaces of each spacer 80 are desirably chamfered for the purpose of burr removal or the like. This is because there is a concern that, when the magnetic disks 30 and the spacers 80 are stacked, burrs on the inner and outer peripheral portions of the spacers 80 come into contact with the magnetic disks 30 and make scratches on the surfaces of the magnetic disks 30. Each of the spacers 80 preferably has a chamfered portion 81, as illustrated in FIG. 4. When outer radius of each spacer 80, inner radius of the spacer 80, length of the chamfered portion 81 on the outer peripheral portion of the spacer 80, length of a chamfered portion 82 on the inner peripheral portion of the spacer 80, outer radius of a contact portion 83 between the spacer 80 and a magnetic disk, and inner radius of the contact portion 83 between the spacer 80 and a magnetic disk 30 are denoted by Rso, Rsi, Lso, Lsi, Rsso, and Rssi, respectively, Rsso=Rso−Lso and Rssi=Rsi+Lsi hold. Length Rst in a radial direction of the contact portion 83 satisfies Rst=Rsso−Rssi. Since the chamfered portions 81 and 82 of each spacer 80 do not contribute to contact with magnetic disks 30 and thus do not contribute to a function of transmitting rotational driving force of the hub 90 to the magnetic disks 30, the lengths Lso and Lsi of the chamfered portions 81 and 82 of the spacer 80 are preferably as small as possible and, specifically, are preferably 0.1 mm or less.

Each spacer 80 is desirably made of a material that causes a thermal expansion coefficient difference between the spacer 80 and a magnetic disk 30 to be small. When a thermal expansion coefficient difference between the spacer 80 and the magnetic disk 30 is large, a positional displacement between the spacer 80 and the magnetic disk 30 occurs in the case where ambient temperature at the time when the magnetic disk 30 device operates changes, and the positional displacement becomes a cause of read/write error. When the magnetic disks 30 are formed of aluminum alloy substrates, aluminum is suitably used for the spacers 80. When the magnetic disks 30 are formed of glass substrates, glass, stainless, or titanium is suitably used for the spacers 80. Further, aimed at preventing the magnetic disks 30 and the spacers 80 from being electrically charged, the spacers 80 desirably have conductivity. When glass is employed for the spacers 80, each of the spacers 80 made of glass desirably has metal films, such as Ni—P plating, formed on the surfaces and the side surfaces thereof.

A case where a plurality of magnetic disks 30 is mounted in the hard disk drive 100 is described below. As illustrated in FIGS. 2 and 3, outer radius of each magnetic disk, thickness of the magnetic disk, outer radius of each spacer, thickness of the spacer 80, and stacking height of the magnetic disks and the spacers are denoted by Rd, Td, Rso, Ts, T, respectively. The inner diameter of a magnetic disk 30 and the inner diameter of a spacer 80 are equal to each other, and the inner radius of a magnetic disk is equal to the inner radius Rsi of a spacer. The inner diameter of a magnetic disk 30 and the inner diameter 2Rsi of a spacer 80 are, for example, 25 mm.

The hard disk drive 100 in which the height H of the housing 10 that conforms to SFF-8301 is 26.1 mm is now considered. When N magnetic disks 30 of thickness Td and N−1 spacers 80 of thickness Ts are alternately stacked in the hard disk drive 100, the stacking height T=N×Td+(N−1)×Ts of the stack needs to be lower than 26.1 mm. However, since the hard disk drive 100 has, in addition to the magnetic disks 30 and the spacers 80, other components, such as the base 20, the circuit board, the spindle motor, the clamp 70, the hub 90, and the top cover, mounted in the space inside thereof, the stacking height T of the magnetic disks 30 and the spacers 80 is preferably 20 mm or less, and more preferably 19 mm or less. Since, as described afore, a lower limit of the thickness Td of each magnetic disk 30 is 0.3 mm, a lower limit of the thickness Ts of each spacer 80 is 1 mm, and an upper limit of the stacking height T of the magnetic disks 30 and the spacers 80 is 20 mm, an upper limit of the number N of the magnetic disks 30 is 16. In addition, in order to achieve higher capacity of the hard disk drive 100, the number N of magnetic disks 30 is 10 or more.

The hub 90 has a shape in which a small-diameter portion 91 having a cylindrical shape and a large-diameter portion 92 are connected to each other in the direction of the rotational axis Z and rotates about the rotational axis Z as the central axis by the spindle motor. The diameter of the small-diameter portion 91 is the same as the inner diameter of the magnetic disks 30 and the inner diameter 2Rsi of the spacers 80. The large-diameter portion 92 sandwiches and fixes the magnetic disks 30 and the spacers 80 with the clamp 70.

Each of the magnetic disks 30 is, as described above, a disk-shaped medium for magnetically recording information and is composed of a substrate, a base layer, a magnetic layer, a protective layer, and a lubricant layer. As the substrate, an aluminum alloy substrate or a glass substrate is suitably used.

(Aluminum Alloy Substrate)

For the aluminum alloy substrate, Al—Mg-based alloy, such as JIS 5086 alloy, that has conventionally been used is suitably used because of high strength thereof. Alternatively, Al—Fe-based alloy is suitably used because of high rigidity thereof.

Specifically, Al—Mg-based alloy is an aluminum alloy that contains 1.0 to 6.5 mass % of Mg, further contains one or two or more elements selected from 0.070 mass % or less of Cu, 0.60 mass % or less of Zn, 0.50 mass % or less of Fe, 0.50 mass % or less of Si, 0.20 mass % or less of Cr, 0.50 mass % or less of Mn, and 0.20 mass % or less of Zr, and has the remainder including aluminum, inevitable impurities, and other trace elements.

Al—Fe-based alloy is an aluminum alloy that contains Fe that is an essential element and one or two elements selected from Mn and Ni that are selective elements, has a relationship in which the total of the contents of Fe, Mn, and Ni described above is 1.00 to 7.00 mass %, further contains one or two or more elements selected from 14.0 mass % or less of Si, 0.7 mass % or less of Zn, 1.0 mass % or less of Cu, 3.5 mass % or less of Mg, 0.30 mass % or less of Cr, and 0.20 mass % or less of Zr, and has the remainder including aluminum, inevitable impurities, and other trace elements.

Next, a manufacturing method of an aluminum alloy substrate is described.

First, an ingot is produced by a semi-continuous casting method, the produced ingot is subjected to hot rolling and cold rolling, and a plate material having a desired thickness is produced. Alternatively, a plate material is produced by a continuous casting, the produced plate material is subjected to cold rolling, and a plate material having a desired thickness is produced. For the purpose of homogenizing the structure of material, an ingot may be subjected to heat treatment. For the purpose of improving processability or the like, a plate material before cold rolling, during cold rolling, or after cold rolling may be subjected to heat treatment.

Next, a plate material produced as described above is punched by a press and a disk-shaped blank having a desired inner diameter dimension and an outer diameter dimension is thereby produced. Subsequently, for the purpose of reducing the flatness of a blank, blanks are stacked on each other and the stacked blanks are subjected to heat treatment with a load applied thereto.

Next, an inner diameter portion and an outer diameter portion of a blank are subjected to cutting by a lathe, and a T-substrate having a desired inner diameter dimension and an outer diameter dimension and chamfered portions of desired lengths is thereby produced. By further subjecting the surfaces on both faces of the blank to cutting, a T-substrate having a desired plate thickness may be produced. Further, for the purpose of removing processing strain induced inside the material due to the cutting, the T-substrate may be subjected to heat treatment.

Next, the surfaces on both faces of the T-substrate are ground by a grinding machine, and a G-substrate having a desired thickness is thereby produced. Further, for the purpose of removing processing strain induced inside the material due to the grinding processing, the G-substrate may be subjected to heat treatment.

Next, an M-substrate that is a substrate made by film-forming plating of a desired thickness on all surfaces including the surfaces, the side surfaces, and chamfered surfaces of the G-substrate is produced. First, for the purpose of improving plating adhesiveness, a G-substrate is subjected to pretreatment. Next, the G-substrate is subjected to plating treatment. As the plating, Ni—P electroless plating is suitably used. Further, aimed at removing internal stress in Ni—P electroless plating, the M-substrate may be subjected to heat treatment.

Next, the surfaces on both faces of the M-substrate are polished by a polishing machine, and a substrate, that is, an aluminum alloy substrate, having a desired thickness is thereby produced. A lower limit of the thickness of an aluminum alloy substrate that is produced by this method is 0.3 mm. This lower limit originates in the thickness of a component, which is referred to as a carrier, that holds an aluminum alloy substrate when the substrate is polished by a polishing machine. Although the thickness of the carrier can be arbitrarily chosen as long as the thickness is greater than or equal to the thickness of the aluminum alloy substrate that is an object to be processed, a carrier that is excessively thin has insufficient strength and is damaged during polishing processing. From the viewpoint of carrier strength, the thickness of the carrier is preferably 0.3 mm or more. Therefore, the lower limit of the thickness of an aluminum alloy substrate, which is an object to be processed, becomes 0.3 mm. Note that a carrier that is made of resin, such as an aramid resin and an epoxy resin, is suitably used. For the purpose of strength improvement, a resin material is sometimes caused to contain a fibrous reinforcing material, such as carbon fiber and glass fiber.

Next, on the surface of the aluminum alloy substrate, the base layer, the magnetic layer, the protective layer, and the lubricant layer are formed. Through this processing, a magnetic disk 30 is completed.

(Glass Substrate)

For a glass substrate, aluminosilicate glass that has high hardness is suitably used. Specifically, aluminosilicate glass contains 55 to 70 mass % of $SiO_2$ as a main component, further contains one or two or more compounds selected from 25 mass % or less of $Al_2O_3$, 12 mass % or less of $Li_2O$, 12 mass % or less of $Na_2O$, 8 mass % or less of $K_2O$, 7 mass % or less of MgO, 10 mass % or less of CaO, 10 mass % or less of $ZrO_2$, and 1 mass % or less of $TiO_2$, and has the remainder including inevitable impurities and other trace elements.

Next, a manufacturing method of a glass substrate is described.

First, glass material adjusted to a predetermined chemical composition is melted and a molten mass of the glass material is press-molded on both sides by a direct press method, and a glass base plate having a desired thickness is thereby produced. The production method of a glass base plate is not limited to the direct press method, and a float method, a fusion method, or a redraw method may be used.

Next, the glass base plate is formed into an annular shape through coring the glass base plate and the inner diameter portion and the outer diameter portion are further subjected to polishing processing, and an annular glass substrate having a desired inner diameter dimension, an outer diameter dimension, and chamfer length is thereby formed.

Next, the surfaces on both faces of the annular glass substrate are ground by a grinding machine, and an annular glass substrate having a desired plate thickness and flatness is thereby formed.

Further, the surfaces on both faces of the annular glass substrate are polished by a polishing machine, and a substrate, that is, a glass substrate, having a desired thickness is thereby produced. During the polishing processing, the annular glass substrate may be subjected to chemical strengthening treatment by a sodium nitrate solution, a potassium nitrate solution, or the like.

A lower limit of the thickness of a glass substrate that is produced by this method is 0.3 mm. This lower limit originates in the thickness of a component, which is referred to as a carrier, that holds a glass substrate when the substrate is polished by a polishing machine. Although the thickness of the carrier can be arbitrarily chosen as long as the thickness is greater than or equal to the thickness of the glass substrate that is an object to be processed, a carrier that is excessively thin has insufficient strength and is damaged during polishing processing. From the viewpoint of carrier strength, the thickness of the carrier is preferably 0.3 mm or more. Therefore, the lower limit of the thickness of a glass substrate, which is an object to be processed, becomes 0.3 mm. Note that a carrier that is made of resin, such as an aramid resin and an epoxy resin, is suitably used. For the purpose of strength improvement, a resin material is sometimes caused to contain a fibrous reinforcing material, such as carbon fiber and glass fiber.

(Impact Resistance)

Figure 5:
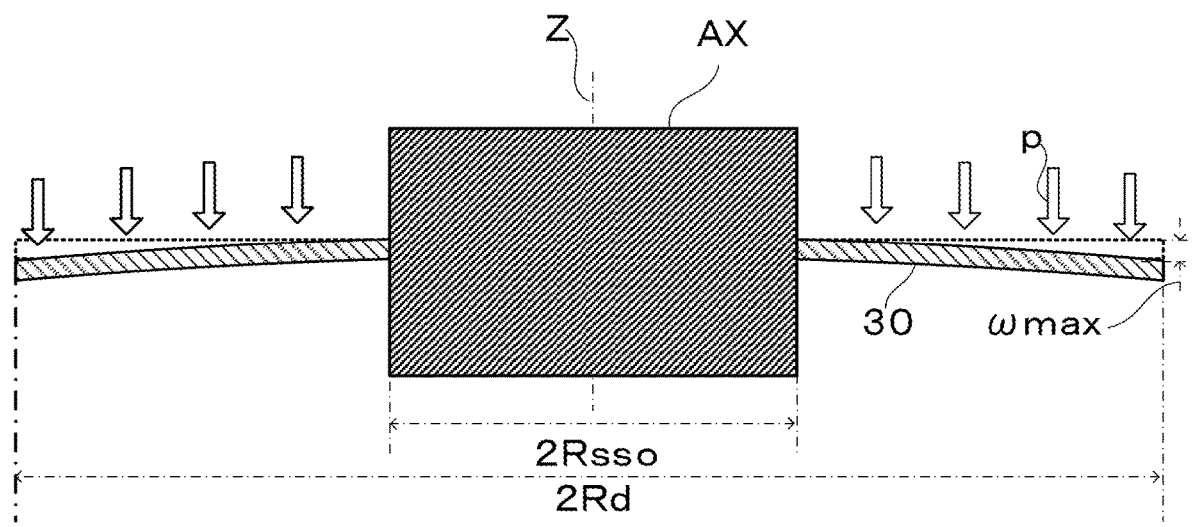
FIG. 5 is a diagram illustrating an impact being applied to a substrate for a magnetic disk that the hard disk drive according to the embodiment includes.

When the hard disk drive 100 is subject to impact from the outside, bending occurs on a magnetic disk 30 as illustrated in FIG. 5 and the magnetic disk 30 and, for example, the ramp load 60 collide with each other. The ramp load 60 is, as described above, a component made of resin that is mounted at a position that is closest to the magnetic disks 30 on the outer peripheral portion side of the magnetic disks 30 for the purpose of causing the head 42 to retreat thereto at the time when the hard disk drive 100 is not in operation. When a magnetic disk 30 and the ramp load 60 collide with each other, a portion of the ramp load 60 breaks off and develops into a foreign object and a scratch is made on the magnetic disk 30, which may cause malfunction. The higher the rigidity of a magnetic disk 30 is, the smaller a bending amount becomes and the smaller the occurrence probability of malfunction becomes. That is, the higher the rigidity of a magnetic disk 30 is, the higher the impact resistance is improved.

(Fluttering Resistance)

During operation of the hard disk drive 100, the magnetic disks 30 rotate at high speed. The rotation speed of the magnetic disks 30 is, for example, 7200 rpm. When the magnetic disks 30 rotate at high speed, turbulence occurs in gas in the magnetic disk 30 device and the magnetic disks 30 vibrate. This vibration phenomenon is referred to as fluttering. When the magnetic disks 30 vibrate, the positional precision of the head 42 deteriorates, which causes a read error. The higher the rigidity of a magnetic disk 30 is, the smaller the amount of vibration becomes and the smaller the probability of read/write errors becomes. That is, the higher the rigidity of a magnetic disk 30 is, the higher the fluttering resistance is improved. Note that a technology to fill the inside of the hard disk drive 100 with, in place of air, helium for the purpose of reducing turbulence of gas inside the hard disk drive 100 has been known.

(Rigidity of Magnetic Disk)

The impact resistance of a magnetic disk 30 is indicated by the magnitude of the bending amount of the magnetic disk 30 at the time when the magnetic disk 30 is subjected to acceleration due to impact. The fluttering resistance of a magnetic disk 30 is indicated by the magnitude of the bending amount of the magnetic disk 30 at the time when the magnetic disk 30 is subject to turbulence of gas having occurred due to the magnetic disk 30 rotating at high speed. That is, the impact resistance and the fluttering resistance of a magnetic disk 30 depend on whether or not the magnetic disk 30 easily bends.

The bending amount of a magnetic disk 30 can be considered using a model in which the magnetic disk 30 is a circular disk the inner peripheral side of which is fixed to a region AX, the circular disk is subjected to a vertical load that is symmetric with respect to the center of the circular disk, and bending that is axially symmetric with respect to the rotational axis Z occurs in the circular disk, and can be calculated by the formula 1 below, as described in "JSME Mechanical Engineers' Handbook, Vol. 4 Material Mechanics, Chapter 5 Plate, Table 36-18".

[Math. 1]

$$\omega = \frac{pa^4}{64D}\left[\left\{\frac{r^2+b^2}{a^2}+8\left(1+A+\ln\frac{a}{r}\right)\right\}\frac{r^2-b^2}{a^2}-4\left(B+\frac{2b^2}{a^2}\right)\ln\frac{r}{b}\right]$$

$$A = -\frac{1}{4}\frac{a^2}{(1+v)a^2+(1-v)b^2}\left\{(1+3v)+(1-v)\left(2+\frac{b^2}{a^2}+4\ln\frac{a}{b}\right)\frac{b^2}{a^2}\right\}$$

$$B = \frac{b^2}{(1+v)a^2+(1-v)b^2}\left\{(1-v)+(1+v)\left(\frac{b^2}{a^2}+4\ln\frac{a}{b}\right)\right\}$$

(Formula 1)

In the above formula, ω is a bending amount of a circular disk, 2a is diameter of the circular disk, 2b is diameter of an inner peripheral fixed portion of the circular disk, r is distance from the center of the circular disk, p is load per unit area, and D is bending rigidity of the disk and is expressed as $D=Eh^3/12(1-v^2)$ where E is a Young's modulus of the circular disk, h is a thickness of the circular disk, and v is a Poisson's ratio of the circular disk.

When these parameters are matched with the parameters in the hard disk drive 100 illustrated in FIGS. 2 and 3, the outer radius Rd of each magnetic disk is equal to a, the outer radius Rsso of each contact portion between a spacer 80 and a magnetic disk 30 is equal to b, the thickness Td of each magnetic disk 30 is equal to h, and the load p per unit area of each magnetic disk 30 is equal to ρTd where ρ is density of each magnetic disk 30. Further, a bending amount ωmax at an outermost peripheral position of a magnetic disk 30 can be calculated by substituting r=Rd into the formula 1. When the above definitions are applied to the formula 1, the formula 1 can be converted to the formula 2 below. Note that the region AX illustrated in FIGS. 2 and 5 is a region that is sandwiched by the large-diameter portion 92 of the hub 90, contact surfaces of the spacers 80, and the clamp 70 and to which the magnetic disks 30 are firmly fixed and is considered as a rigid body.

[Math. 2]

$$\omega_{max} = f(R_d, R_{sso}, v)\frac{\rho}{ET_d^2}$$

$$f(R_d, R_{ssO}, v) = \left\{\frac{12(1-v^2)R_d^4}{64}\right\}\left[\left(\frac{R_d^2+R_{sso}^2}{R_d^2}+8(1+A)\right)\left(\frac{R_d^2-R_{sso}^2}{R_d^2}\right)-4\left(B+\frac{2R_{sso}^2}{R_d^2}\right)\ln\frac{R_d}{R_{sso}}\right]$$

$$A = -\frac{1}{4}\frac{R_d^2}{(1+v)R_d^2+(1-v)R_{sso}^2}\left\{(1+3v)+(1-v)\left(2+\frac{R_{sso}^2}{R_d^2}+4\ln\frac{R_d}{R_{sso}}\right)\frac{R_{sso}^2}{R_d^2}\right\}$$

$$B = \frac{R_{sso}^2}{(1+v)R_d^2+(1-v)R_{sso}^2}\left\{(1-v)+(1+v)\left(\frac{R_{sso}^2}{R_d^2}+4\ln\frac{R_d}{R_{sso}}\right)\right\}$$

(Formula 2)

That is, the bending amount ωmax at the outermost peripheral position of a magnetic disk 30 can be expressed by a function of the outer radius Rd of the magnetic disk 30, the thickness Td of the magnetic disk 30, the outer radius Rsso of a contact portion between a spacer 80 and the magnetic disk 30, the Young's modulus E of the magnetic disk 30, the density p of the magnetic disk 30, and the Poisson's ratio ν of the magnetic disk 30. Note that the formula 1 and the formula 2, which is derived from the formula 1, can be applied to not only the magnetic disks 30 but also any circular disk the inner peripheral portion of which is fixed, such as a magnetic disk substrate and a disk other than a disk to be used as a magnetic disk.

The density ρ of the magnetic disk 30 or a magnetic disk substrate can be measured by an Archimedes' method, and the Young's modulus E and the Poisson's ratio ν thereof can be measured by an ultrasonic pulse method or the like. Note that, although, when the substrate of a magnetic disk 30 is formed of an aluminum alloy substrate, ρ, E, and ν depend on aluminum alloy thickness and Ni—P plating thickness because the aluminum alloy substrate is a composite of aluminum alloy and Ni—P plating, ρ can be measured by an Archimedes' method and E and ν can be measured by an ultrasonic pulse method or the like, as described above.

(Data Space of Hard Disk Drive)

The size of data space S in a hard disk drive can be calculated by the formula 3 below when size of data space per magnetic disk both surfaces of which are recordable, the number of magnetic disks to be mounted, inner radius of data space of each magnetic disk, and outer radius of the data space of the magnetic disk are denoted by Sd, N, Rddi, and Rddo, respectively.

[Math. 3]

$$S = S_d N = 2\pi(R_{ddo}^2 - R_{ddi}^2)N \quad \text{(Formula 3)}$$

(Power Consumption at Starting of Hard Disk Drive 100)

The lower is power consumption of the hard disk drive 100, the more preferable it is. Herein, the amount of work that the hub 90 that incorporates the spindle motor therein and has a diameter of 25 mm performs at the starting of the hard disk drive 100, that is, during a period from when the magnetic disks 30 start to rotate from a stopped state until when the magnetic disks 30 reach a steady state (for example, rotating at 7200 rpm) is focused on. The work that the hub 90 performs is to rotate a stacked body composed of the magnetic disks 30 and the spacers 80 (hollow circular cylinder) about the rotational axis Z, and the amount of the work is proportional to inertia moment of the stacked body composed of the magnetic disks 30 and the spacers 80. It is assumed that angular acceleration has a constant value during a period from when the magnetic disks start to rotate from a stopped state until when the magnetic disks reach a steady state.

First, inertia moment Iz of a hollow right circular cylinder can be calculated by the formula 4 below, as described in "JSME Mechanical Engineers' Handbook, Vol. 3 Mechanics, Chapter 2 Center of Gravity and Inertia Moment, Section 2-2-5-e Hollow Right Circular Cylinder".

[Math. 4]

$$I_Z = m\left(\frac{R^2+r^2}{2}\right) \quad \text{(Formula 4)}$$

In the formula 4, m, R, and r denote mass of the hollow right circular cylinder, outer radius of the hollow right circular cylinder, and inner radius of the hollow right circular cylinder, respectively. Inertia moment Ids of the stacked body composed of the magnetic disks 30 and the spacers 80 is the sum of inertia moment Id of the magnetic disks 30 and inertia moment Is of the spacers 80, and the formula 5 below is obtained through calculation using the formula 4.

[Math. 5]

$$I_{ds} = I_d + I_s$$

$$I_d = m_d\left(\frac{R_d^2+R_{si}^2}{2}\right) = \frac{1}{2}\pi\rho NT_d(R_d^4 - R_{si}^4)$$

$$I_s = m_s\left(\frac{R_{so}^2+R_{si}^2}{2}\right) = \frac{1}{2}\pi\rho_s(N-1)T_s(R_{so}^4 - R_{si}^4)$$

(Formula 5)

In the formula 5, md, ρ, N, Td, Rd, ms, ρs, N−1, Ts, and Rso are total mass of the magnetic disks 30, density of the magnetic disks 30, the number of the magnetic disks 30, thickness of each magnetic disk 30, outer radius of each magnetic disk 30, total mass of the spacers 80, density of the spacers 80, the number of the spacers 80, thickness of each spacer, and outer radius of each spacer 80, respectively. Rsi is inner radius of each spacer, is equal to inner radius of each magnetic disk, and is 25 mm.

By using the above-described parameters, the amount of work that the hub 90 performs during a period from when the magnetic disks 30 start to rotate from a stopped state until when the magnetic disks 30 reach a steady state, that is, power consumption at the starting of the hard disk drive 100, can be estimated.

When the hard disk drive 100 has the magnetic disks 30 formed of aluminum alloy substrates mounted thereon, the thickness Td of a magnetic disk 30 is preferably 0.47 mm or more and 0.55 mm or less, the number N of the magnetic disks 30 is preferably 10, the outer diameter 2Rso of the spacers 80 is preferably 38 mm or more and 42 mm or less, and the thickness Ts of each spacer 80 is preferably 1.5 mm or more. Because of the configuration as described above, the hard disk drive 100 excels in low power consumption at starting.

When the hard disk drive 100 has the magnetic disks 30 formed of glass substrates mounted thereon, the thickness Td of a magnetic disk 30 is preferably 0.37 mm or more and 0.41 mm or less, the number N of the magnetic disks 30 is preferably 10, the outer diameter 2Rso of the spacers 80 is preferably 39 mm or more and 42 mm or less, and the thickness Ts of each spacer 80 is preferably 1.6 mm or more. Because of the configuration as described above, the hard disk drive 100 excels in low power consumption at starting.

As described above, according to the hard disk drive 100 and the spacers 80 of the present embodiment, setting the outer diameter 2Rso of the spacers 80 to the above-described value enables, without increasing the bending amount of the magnetic disks 30, that is, with the impact resistance and the fluttering resistance of the hard disk drive 100 maintained, the data space in the hard disk drive 100 to be increased and a 3.5-inch hard disk drive 100 with high capacity to be provided. Further, setting the thickness of the spacers 80 to the above-described value enables distance between magnetic disks suitable for a use in HAMR or MAMR to be obtained. In addition, setting the outer diameter 2Rso of the spacers 80 and the thickness Td of and the number N of the magnetic disks 30 to the above-described values enables the hard disk drive 100 that excels in low power consumption at starting to be provided. Therefore, it is possible to provide the hard disk drive 100 and the spacers 80 that have excellent impact resistance and fluttering resistance and have a large data space in the hard disk drive 100. Installing the hard disk drive 100 in a data center contributes to achievement of higher capacity of the data center. In addition, an approach employed by the present embodiment in which increasing the outer diameter of the spacers 80 in the hard disk drive 100 causes bending of the magnetic disks to be prevented and reducing the thickness of the magnetic disks 30 and increasing the number of mounted magnetic disks 30 cause the data space to be increased can be applied to not only a 3.5-inch hard disk drive 100 but also a hard disk drive 100 of any size. The type of magnetic disks 30 of the present embodiment is not limited to magnetic disks 30 formed of aluminum alloy substrates or glass substrates, and the present embodiment can be applied to any types of magnetic disks 30.

Variations

In the above-described embodiment, an example in which the inner diameter 2Rsi of the magnetic disks 30 and the spacers 80 is 25 mm was described. Roles of the spacers 80 are to secure gaps between the plurality of magnetic disks 30 and to transmit rotational driving force of the hub 90 to the magnetic disks 30 that are not in direct contact with the hub 90 or the clamp 70 by coming into contact with and adhering to the magnetic disks 30. As long as the roles described above are fulfilled, the inner diameter 2Rsi is not limited to a specific value. When the length Rst=Rsso−Rssi in a radial direction of the contact portions 83 of the spacers 80 illustrated in FIG. 4 is 7 mm or more, the spacers 80 can fulfill the roles described above. When the length Lso of the chamfered portion 81 of each spacer 80 is sufficiently small with respect to the length Rst, the inner radius Rsi of the spacer 80 is preferably less than or equal to a value obtained by subtracting 7 mm from the outer radius Rso. In this case, it is possible to secure a length of 7 mm or more as the length Rst=Rsso−Rssi in a radial direction of the contact portion 83 of each spacer 80.

Examples

Although the present disclosure is described in more detail below based on Examples, the present disclosure is not limited to Examples.

(Bending Amount of Magnetic Disk)

With respect to the bending amount ωmax at the outermost peripheral position of a magnetic disk 30, actual measured values of the bending amounts ωmax of magnetic disks 30 are compared with calculated values that can be calculated using the formula 2 and the formula 2 being capable of predicting an actual bending amount ωmax of a magnetic disk 30 is thereby verified.

First, an aluminum alloy ingot that contains 0.7 mass % of Fe, 0.9 mass % of Mn, 1.7 mass % of Ni, 0.06 mass % of Si, 0.3 mass % of Zn, and 0.02 mass % of Cu and has the remainder including aluminum, inevitable impurities, and other trace elements was produced by a semi-continuous casting method.

Next, the ingot produced by the semi-continuous casting method was subjected to soaking, hot rolling, and cold rolling, and plate materials were thereby produced. The plate materials were punched by a press, stacked on each other, and subjected to heat treatment with a load applied to the stacked plate materials, and blanks were thereby produced. An inner diameter portion and an outer diameter portion of each blank were subjected to cutting by a lathe and the surfaces on both faces of the blank were subjected to cutting and grinding processing, and aluminum alloy substrates (G-substrates) were thereby produced. The inner diameter and the outer diameter of the aluminum alloy substrates are 25 mm and 97 mm, respectively. Three types of aluminum alloy substrates having plate thicknesses of 0.604 mm, 0.480 mm, and 0.461 mm were produced.

With respect to the aluminum alloy substrates, a bending amount ωmax of each aluminum alloy substrate was actually measured using an impact test device. The impact test device includes a hub and a clamp to sandwich and fix an aluminum alloy substrate between spacers and a sensor to measure displacement of an outermost peripheral position of the aluminum alloy substrate. As the spacers, spacers each of which is made of aluminum and has an outer diameter of 32 mm, an inner diameter of 25 mm, and a thickness of 1.7 mm were used. The aluminum alloy substrate is sandwiched by the spacers and installed in the impact test device, an impact with an acceleration of 50 G and an application time of 3 ms was applied, and a bending amount ωmax at an outermost peripheral position of the aluminum alloy substrate due to the impact was actually measured. The bending amount ωmax was measured three times for each sample. Subsequently, relative values of the bending amounts ωmax at respective plate thicknesses were calculated with an average bending amount ωmax at a plate thickness of 0.461 mm assumed to be 100%.

When the bending amount of a magnetic disk 30 due to impact is large, the magnetic disk 30 strongly collides with a component inside the hard disk drive 100, for example, the ramp load 60, and a portion of the ramp load 60 breaks off and develops into a foreign object or a scratch is made on the magnetic disk 30, which may cause malfunction. Thus, the smaller the bending amount of the magnetic disk 30 is, the more excellent the impact resistance is. The magnetic disk 30 is a magnetic disk in which a base layer, a magnetic layer, a protective layer, and a lubricant layer are film-formed on an aluminum alloy substrate, and the bending amount ωmax of the magnetic disk 30 can be approximated by the bending amount ωmax of the aluminum alloy substrate.

Next, a bending amount at an outermost peripheral position of an aluminum alloy substrate was calculated using the formula 2. The outer diameter 2Rd of the aluminum alloy substrate was set to 97 mm, the thickness Td of the aluminum alloy substrate was set to three levels, namely 0.604 mm, 0.480 mm, and 0.461 mm, the outer diameter 2Rsso of the contact portion between the spacer 84 and the aluminum alloy substrate was set to 31.8 mm, E was set to 79 GPa, ρ was set to 2.7 g/cm³, and ν was set to 0.33. Subsequently, relative values of the bending amount at respective plate thicknesses were calculated with a bending amount at a plate thickness of 0.461 mm assumed to be 100%.

Figure 6:
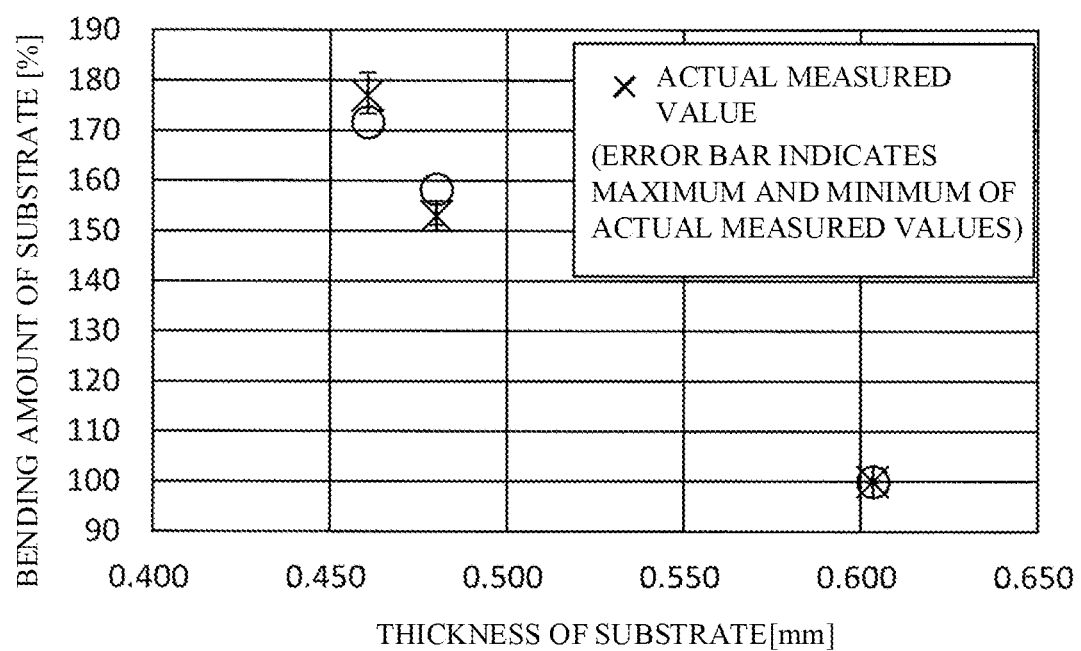
FIG. 6 is a diagram illustrating a comparison between actual measured values and calculated values of bending amounts of substrates according to Examples.

Actual measured values and calculated values of the bending amounts at outermost peripheral positions of the aluminum alloy substrates obtained as described above are illustrated in FIG. 6. The actual measured values and the calculated values substantially coincide with each other, which indicates that the formula 2 is capable of predicting an actual bending amount of a magnetic disk 30.

(Impact Resistance and Fluttering Resistance)

Next, the hard disk drive 100 being capable of increasing data space in the hard disk drive with impact resistance and fluttering resistance maintained is verified with a commercially available hard disk drive as a reference.

Outer radius Rd of a magnetic disk, a thickness Td of the magnetic disk, an outer radius Rso of a spacer, a thickness Ts of the spacer, and an outer radius Rsso of a contact portion between the spacer and the magnetic disk of the commercially available hard disk drive were actually measured using a vernier caliper.

The impact resistance and the fluttering resistance were evaluated based on the magnitude of a bending amount at the outermost peripheral position of a magnetic disk, using the formula 2. Relative evaluation was performed with the bending amount of the reference assumed to be 100%, and a case in which the bending amount was less than or equal to 100% was determined to be a good case.

The size of the data space S in the hard disk drive 100 was calculated using the formula 3. However, the calculation was performed assuming that the inner radius Rddi of the data space S on a magnetic disk 30 is obtained by adding 2 mm to the inner radius Rsi of a spacer 80 and the outer radius Rddo of the data space S on the magnetic disk 30 is obtained by subtracting 2 mm from the outer radius Rso of the spacer 80. Relative evaluation was performed with the size of data space S of the reference assumed to be 100%, and a case in which the size of the data space S was greater than or equal to 100% was determined to be a good case.

The power consumption at the starting of the hard disk drive 100 was calculated by calculating the inertia moment Ids of the stacked body composed of the magnetic disks 30 and the spacers 80 using the formula 5. Relative evaluation was performed with the inertia moment Ids of the reference stacked body assumed to be 100%. A case in which the inertia moment was less than or equal to 100% was determined to be a good case.

(Aluminum Alloy Substrate)

A hard disk drive MG07ACA14TE manufactured by Toshiba Corporation in which nine magnetic disks each of which is formed of an aluminum alloy substrate and has an outer diameter of 95 mm and an inner diameter of 25 mm are mounted was set as a reference A. The reference A, examples, and comparative examples are shown in Table 1. Calculation was performed under the assumption that, with respect to magnetic disks of the reference A, the examples, and the comparative examples, E=74 GPa, ρ=2.8 g/cm³, and ν=0.33, and, with respect to spacers thereof, ρs=2.7 g/cm³. Calculation results are summarized in Tables 1 and 2.

TABLE 1

| | Outer Diameter of Magnetic Disk 2Rd[mm] | Thickness of Magnetic Disk Td[mm] | Number of Magnetic Disks [sheet] | Outer Diameter of Spacer 2Rso[mm] | Inner Diameter of Spacer 2Rsi[mm] | Thickness of Spacer Ts[mm] | Outer Diameter of Contact Portion between Magnetic Disk and Spacer 2Rsso[m] |
|---|---|---|---|---|---|---|---|
| Reference A | 95 | 0.635 | 9 | 32.9 | 25 | 1.65 | 32.7 |
| Example 1-1 | 95 | 0.55 | 10 | 38 | 25 | 1.5 | 37.8 |
| Example 1-2 | 95 | 0.54 | 10 | 38 | 25 | 1.5 | 37.9 |
| Example 1-3 | 95 | 0.53 | 10 | 39 | 25 | 1.5 | 38.8 |
| Example 1-4 | 95 | 0.52 | 10 | 40 | 25 | 1.5 | 39.9 |
| Example 1-5 | 95 | 0.51 | 10 | 42 | 25 | 1.5 | 41.8 |
| Example 1-6 | 95 | 0.5 | 10 | 41 | 25 | 1.5 | 40.9 |
| Example 1-7 | 95 | 0.49 | 10 | 41 | 25 | 1.5 | 40.8 |
| Example 1-8 | 95 | 0.48 | 10 | 42 | 25 | 1.5 | 41.9 |
| Example 1-9 | 95 | 0.47 | 10 | 42 | 25 | 1.5 | 41.8 |
| Example 1-10 | 96 | 0.6 | 10 | 35 | 25 | 1.5 | 34.9 |
| Example 1-11 | 95 | 0.6 | 11 | 48 | 25 | 1.2 | 47.8 |
| Example 1-12 | 95 | 0.6 | 12 | 53 | 25 | 1.1 | 52.9 |
| Example 1-13 | 95 | 0.55 | 11 | 38 | 25 | 1.3 | 37.8 |
| Exemple 1-14 | 95 | 0.55 | 12 | 40 | 25 | 1.2 | 39.9 |
| Exemple 1-15 | 95 | 0.55 | 13 | 57 | 25 | 1 | 56.8 |
| Example 1-16 | 95 | 0.5 | 12 | 53 | 25 | 1.1 | 52.9 |

TABLE 1-continued

| | | | | | | | |
|---|---|---|---|---|---|---|---|
| Exemple 1-17 | 95 | 0.45 | 11 | 44 | 25 | 1.4 | 43.8 |
| Example 1-18 | 95 | 0.4 | 12 | 53 | 25 | 1.2 | 52.9 |
| Example 1-19 | 95 | 0.4 | 13 | 47 | 25 | 1.1 | 46.8 |
| Example 1-20 | 95 | 0.4 | 14 | 47 | 25 | 1 | 46.9 |
| Example 1-21 | 95 | 0.4 | 14 | 60 | 25 | 1.1 | 59.8 |
| Example 1-22 | 95 | 0.4 | 15 | 47 | 25 | 1 | 46.9 |
| Example 1-23 | 95 | 0.4 | 15 | 62 | 25 | 1 | 61.8 |
| Example 1-24 | 95 | 0.3 | 14 | 60 | 25 | 1.2 | 59.9 |
| Example 1-25 | 95 | 0.3 | 15 | 53 | 25 | 1.1 | 52.8 |
| Example 1-26 | 95 | 0.3 | 16 | 53 | 25 | 1 | 52.9 |
| Example 1-27 | 95 | 0.3 | 16 | 63 | 25 | 1 | 62.8 |

| | Stacking Height of Magnetic Disks and Spacers T[mm] | Bending Amount at Outermost Peripheral Position of Magnetic Disk ωmax[%] | Data Space of Hard Disk Drive S[%] | Power Consumption at Starting of Hard Disk Drive P[%] | Comprehensive Evaluation |
|---|---|---|---|---|---|
| Reference A | 18.916 | 100.0 | 100.0 | 100.0 | — |
| Example 1-1 | 19 | 95.9 | 105.4 | 98.9 | Very Good |
| Example 1-2 | 18.9 | 98.8 | 105.4 | 97.1 | Very Good |
| Example 1-3 | 18.8 | 96.4 | 104.2 | 96.0 | Very Good |
| Example 1-4 | 18.7 | 92.7 | 102.9 | 95.0 | Very Good |
| Example 1-5 | 18.6 | 84.0 | 100.4 | 94.8 | Very Good |
| Example 1-6 | 18.5 | 93.4 | 101.7 | 92.3 | Very Good |
| Example 1-7 | 18.4 | 97.9 | 101.7 | 90.6 | Very Good |
| Example 1-8 | 18.3 | 94.2 | 100.4 | 89.7 | Very Good |
| Example 1-9 | 18.2 | 98.9 | 100.4 | 87.9 | Very Good |
| Example 1-10 | 19.5 | 97.6 | 108.9 | 105.8 | Good |
| Example 1-11 | 18.6 | 37.8 | 101.1 | 125.0 | Good |
| Example 1-12 | 19.3 | 23.9 | 100.9 | 141.7 | Good |
| Example 1-13 | 19.05 | 95.9 | 115.9 | 108.1 | Good |
| Exemple 1-14 | 19.8 | 82.9 | 123.5 | 118.9 | Good |
| Exemple 1-15 | 19.15 | 19.3 | 100.5 | 147.1 | Good |
| Example 1-16 | 18.1 | 34.5 | 100.9 | 121.1 | Good |
| Exemple 1-17 | 18.95 | 92.8 | 107.5 | 94.3 | Good |
| Example 1-18 | 18 | 53.9 | 100.9 | 102.2 | Good |
| Example 1-19 | 18.4 | 92.5 | 121.4 | 101.0 | Good |
| Example 1-20 | 18.6 | 91.7 | 130.8 | 107.7 | Good |
| Example 1-21 | 19.9 | 20.7 | 100.6 | 132.2 | Good |
| Example 1-22 | 20 | 91.7 | 140.1 | 115.5 | Good |
| Example 1-23 | 20 | 20.7 | 102.1 | 143.4 | Good |
| Example 1-24 | 19.8 | 46.1 | 100.6 | 111.5 | Good |
| Example 1-25 | 19.9 | 96.7 | 126.1 | 100.4 | Good |
| Example 1-26 | 19.8 | 95.8 | 134.5 | 104.9 | Good |
| Example 1-27 | 19.8 | 32.5 | 105.8 | 128.7 | Good |

TABLE 2

| | Outer Diameter of Magnetic Disk 2Rd[mm] | Thickness of Magnetic Disk Td[mm] | Number of Magnetic Disks [sheet] | Outer Diameter of Spacer 2Rso[mm] | Inner Diameter of Spacer 2Rsi[mm] | Thickness of Spacer Ts[mm] | Outer Diameter of Contact Portion between Magnetic Disk and Spacer 2Rsso[m] |
|---|---|---|---|---|---|---|---|
| Comparative Example 1-1 | 95 | 0.6 | 10 | 34 | 25 | 1.4 | 33.8 |
| Comparative Example 1-2 | 95 | 0.55 | 10 | 37 | 25 | 1.5 | 36.9 |
| Comparative Example 1-3 | 95 | 0.5 | 12 | 40 | 25 | 1.1 | 39.8 |
| Comparative Example 1-4 | 95 | 0.45 | 11 | 42 | 25 | 1.4 | 41.9 |
| Comparative Example 1-5 | 95 | 0.4 | 12 | 46 | 25 | 1.3 | 45.8 |
| Comparative Example 1-6 | 95 | 0.35 | 12 | 49 | 25 | 1.4 | 48.9 |
| Comparative Example 1-7 | 95 | 0.3 | 16 | 52 | 25 | 1 | 51.8 |

TABLE 2-continued

| | | | | | | | |
|---|---|---|---|---|---|---|---|
| Comparative Example 1-8 | 95 | 0.6 | 12 | 54 | 25 | 1.1 | 53.9 |
| Comparative Example 1-9 | 95 | 0.55 | 10 | 43 | 25 | 1.4 | 42.8 |
| Comparative Example 1-10 | 95 | 0.5 | 10 | 43 | 25 | 1.5 | 42.9 |
| Comparative Example 1-11 | 95 | 0.45 | 11 | 49 | 25 | 1.4 | 48.8 |
| Comparative Example 1-12 | 95 | 0.4 | 15 | 63 | 25 | 1 | 62.9 |
| Comparative Example 1-13 | 95 | 0.35 | 12 | 54 | 25 | 1.4 | 53.8 |
| Comparativo Example 1-14 | 95 | 0.3 | 12 | 54 | 25 | 1.4 | 53.9 |
| Comparative Example 1-15 | 95 | 0.3 | 13 | 58 | 25 | 1.3 | 57.8 |
| Comparative Example 1-16 | 95 | 0.3 | 14 | 61 | 25 | 1.2 | 60.9 |
| Converative Example 1-17 | 95 | 0.3 | 15 | 63 | 25 | 1.1 | 62.8 |
| Comparative Example 1-18 | 95 | 0.3 | 16 | 65 | 25 | 1 | 64.9 |

| | Stacking Height of Magnetic Disks and Spacers T[mm] | Bending Amount at Outermost Peripheral Position of Magnetic Disk $\omega max$[%] | Data Space of Hard Disk Drive S[%] | Power Consumption at Starting of Hard Disk Drive P[%] | Comprehensive Evaluation |
|---|---|---|---|---|---|
| Comparative Example 1-1 | 18.6 | 104.6 | 109.9 | 105.2 | Poor |
| Comparative Example 1-2 | 19 | 101.9 | 106.6 | 98.3 | Poor |
| Comparative Example 1-3 | 18.1 | 101.0 | 123.5 | 108.1 | Poor |
| Comparative Example 1-4 | 18.95 | 107.1 | 110.4 | 92.5 | Poor |
| Comparative Example 1-5 | 19.1 | 100.3 | 113.8 | 94.0 | Poor |
| Comparative Example 1-6 | 19.6 | 101.2 | 108.5 | 88.7 | Poor |
| Comparative Example 1-7 | 19.3 | 106.2 | 137.2 | 103.2 | Poor |
| Comparative Example 1-8 | 19.3 | 21.7 | 98.9 | 143.2 | Poor |
| Comparative Example 1-9 | 18.1 | 67.0 | 99.0 | 101.9 | Poor |
| Comparative Example 1-10 | 18.5 | 80.5 | 99.0 | 93.9 | Poor |
| Comparative Example 1-11 | 18.95 | 61.7 | 99.5 | 100.0 | Poor |
| Comparative Example 1-12 | 20 | 18.1 | 99.2 | 146.2 | Poor |
| Comparative Example 1-13 | 19.6 | 64.5 | 98.9 | 97.2 | Poor |
| Comparativo Example 1-14 | 19 | 87.0 | 98.9 | 86.9 | Poor |
| Comparative Example 1-15 | 19.5 | 58.2 | 98.1 | 101.2 | Poor |
| Comparative Example 1-16 | 19.8 | 41.0 | 98.0 | 114.3 | Poor |
| Converative Example 1-17 | 19.9 | 32.5 | 99.2 | 124.8 | Poor |
| Comparative Example 1-18 | 19.8 | 24.8 | 99.5 | 135.1 | Poor |

Figure 7:
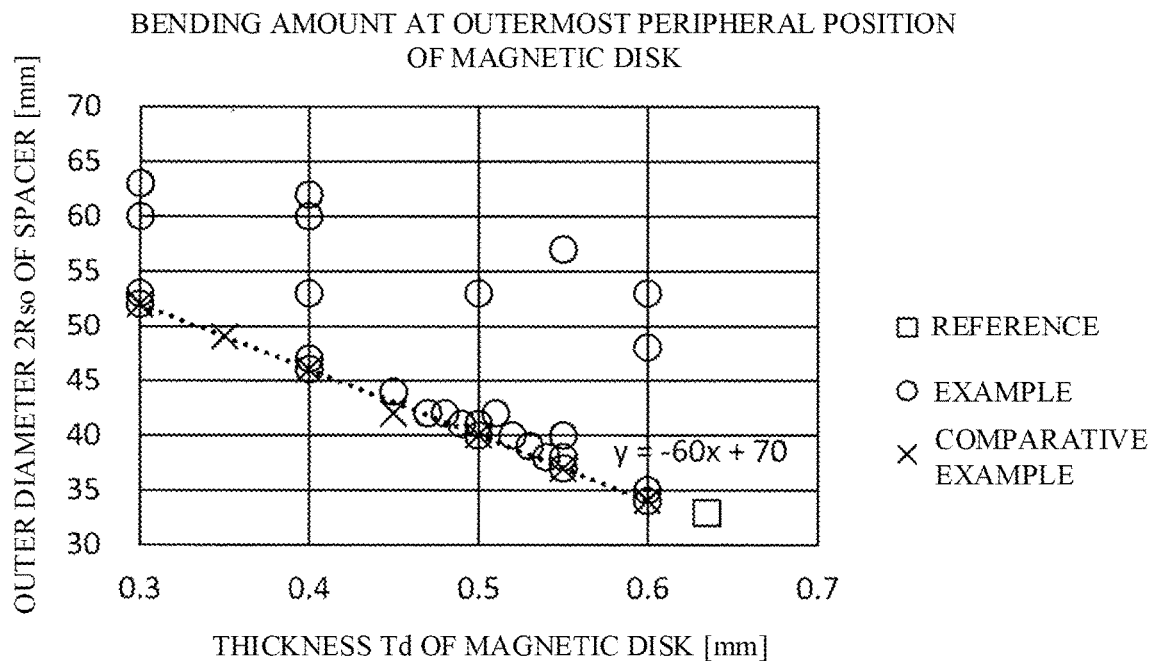
FIG. 7 is a graph illustrating a good/poor relationship between an outer diameter of a spacer and a bending amount of a magnetic disk for each thickness of a magnetic disk with respect to magnetic disks according to Examples.
Figure 8:
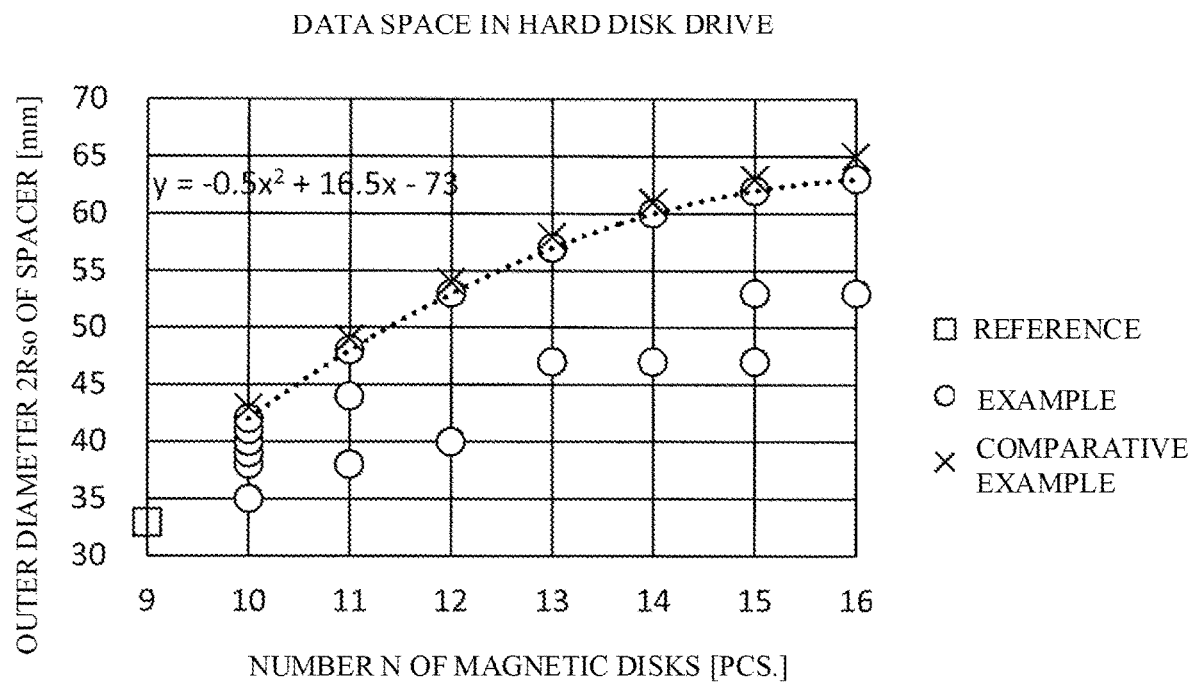
FIG. 8 is a graph illustrating a good/poor relationship between an outer diameter of a spacer and data space of a magnetic disk for each number of magnetic disks with respect to magnetic disks according to Examples.

In Examples 1-1 to 1-27, bending amounts of magnetic disks are less than or equal to that of the reference, and sizes of data spaces in hard disk drives are greater than or equal to that of the reference. In FIG. 7 in which the abscissa represents a thickness Td of a magnetic disk and the ordinate represents an outer diameter 2Rso of a spacer, an example in which the bending amount of a magnetic disk is less than or equal to that of the reference is indicated as a good case (by a circular mark ○), a comparative example in which the bending amount of a magnetic disk exceeds that of the reference is indicated as a poor case (by an X mark x), and the reference A is indicated by a square mark (□). In addition, in FIG. 8 in which the abscissa represents the number N of magnetic disks and the ordinate represents an outer diameter 2Rso of a spacer, an example in which the size of data space in a hard disk drive is greater than or equal to that of the reference is indicated by a circular mark (○), a comparative example in which the size of data space is less than that of the reference is indicated by an X mark (x), and the reference A is indicated by a square mark (□).

From the above results, it is revealed that, in the case of a 3.5-inch hard disk drive having magnetic disks formed of aluminum alloy substrates mounted thereon, when the thickness Td of each magnetic disk is 0.3 to 0.6 mm, the number N of magnetic disks is 10 to 16, and the outer diameter 2Rso of each spacer satisfies $2Rso \geq -60Td+70$ and $2Rso \leq -0.5N^2 + 16.5N - 73$, the bending amount of a magnetic disk becomes less than or equal to that of the reference and the size of data space becomes greater than or equal to that of the reference.

Preferably, it is desirable that a distance of 1.5 mm or more between magnetic disks that is sufficient to cause a head stack assembly for HAMR in which a laser element is mounted or a head stack assembly for MAMR in which a microwave generating element is mounted to operate be secured and power consumption at the starting of the hard disk drive be less than or equal to that of the reference.

Examples 1-1 to 1-9 that are indicated as "Very Good" in the column "Comprehensive Evaluation" in Table 1 satisfy the requirements.

In Comparative Examples 1-1 to 1-7, the bending amounts of magnetic disks are greater than that of the reference and the impact resistance and the fluttering resistance are inferior to those of the reference, as shown in Table 2. In Comparative Examples 1-8 to 1-18, data spaces in hard disk drives are smaller than that of the reference and higher capacity thus cannot be achieved.

(Glass Substrate)

A hard disk drive Exos X16 ST16000NM001G manufactured by Seagate Technology PLC in which nine magnetic disks each of which is formed of a glass substrate and has an outer diameter of 97 mm and an inner diameter of 25 mm are mounted was set as a reference B. The reference B, examples, and comparative examples are shown in Tables 3 and 4. Calculation was performed under the assumption that, with respect to magnetic disks of the reference B, the examples, and the comparative examples, E=83 GPa, $\rho$=2.5 g/cm$^3$, and $\nu$=0.23, and, with respect to spacers thereof, $\rho s$=4.4 g/cm$^3$.

TABLE 3

| | Outer Diameter of Magnetic Disk 2Rd[mm] | Thickness of Magnetic Disk Td[mm] | Number of Magnetic Disks [sheet] | Outer Diameter of Spacer 2Rso[mm] | Inner Diameter of Spacer 2Rsi[mm] | Thickness of Spacer Ts[mm] | Outer Diameter of Contact Portion between Magnetic Disk and Spacer 2Rsso[m] |
|---|---|---|---|---|---|---|---|
| Reference B | 97 | 0.5 | 9 | 32.6 | 25 | 1.8 | 32.4 |
| Example 2-1 | 97 | 0.41 | 10 | 39 | 25 | 1.6 | 38.8 |
| Example 2-2 | 97 | 0.4 | 10 | 40 | 25 | 1.6 | 39.9 |
| Example 2-3 | 97 | 0.4 | 10 | 41 | 25 | 1.6 | 40.8 |
| Example 2-4 | 97 | 0.39 | 10 | 41 | 25 | 1.6 | 40.9 |
| Example 2-5 | 97 | 0.39 | 10 | 42 | 25 | 1.6 | 41.8 |
| Example 2-6 | 97 | 0.38 | 10 | 42 | 25 | 1.6 | 41.9 |
| Example 2-7 | 97 | 0.37 | 10 | 42 | 25 | 1.6 | 41.8 |
| Example 2-8 | 97 | 0.49 | 10 | 34 | 25 | 1.6 | 33.9 |
| Example 2-9 | 97 | 0.47 | 11 | 35 | 25 | 1.4 | 34.8 |
| Example 2-10 | 97 | 0.45 | 12 | 37 | 25 | 1.3 | 36.9 |
| Example 2-11 | 97 | 0.45 | 13 | 40 | 25 | 1.1 | 39.8 |
| Example 2-12 | 97 | 0.45 | 14 | 61 | 25 | 1 | 60.9 |
| Example 2-13 | 97 | 0.43 | 10 | 38 | 25 | 1.6 | 37.8 |
| Example 2-14 | 97 | 0.4 | 12 | 40 | 25 | 1.3 | 39.9 |
| Example 2-15 | 97 | 0.4 | 13 | 45 | 25 | 1.2 | 44.8 |
| Example 2-16 | 97 | 0.4 | 14 | 50 | 25 | 1.1 | 49.9 |
| Example 2-17 | 97 | 0.4 | 15 | 63 | 25 | 1 | 62.8 |
| Example 2-18 | 97 | 0.37 | 11 | 42 | 25 | 1.5 | 41.9 |
| Example 2-19 | 97 | 0.35 | 11 | 44 | 25 | 1.5 | 43.8 |
| Example 2-20 | 97 | 0.35 | 13 | 50 | 25 | 1 | 49.9 |
| Example 2-21 | 97 | 0.35 | 15 | 63 | 25 | 1 | 62.8 |
| Example 2-22 | 97 | 0.32 | 15 | 46 | 25 | 1 | 45.9 |
| Example 2-23 | 97 | 0.3 | 11 | 48 | 25 | 1.6 | 47.8 |
| Example 2-24 | 97 | 0.3 | 11 | 48 | 25 | 1.5 | 47.9 |
| Example 2-25 | 97 | 0.3 | 12 | 53 | 25 | 1.4 | 52.8 |
| Example 2-26 | 97 | 0.3 | 13 | 58 | 25 | 1.2 | 57.9 |
| Example 2-27 | 97 | 0.3 | 14 | 52 | 25 | 1.1 | 51.8 |
| Example 2-28 | 97 | 0.3 | 15 | 55 | 25 | 1.1 | 54.9 |
| Example 2-29 | 97 | 0.3 | 16 | 48 | 25 | 1 | 47.8 |
| Example 2-30 | 97 | 0.3 | 16 | 65 | 25 | 1 | 64.9 |

TABLE 3-continued

|  | Stacking Height of Magnetic Disks and Spacers T[mm] | Bending Amount at Outermost Peripheral Position of Magnetic Disk ωmax[%] | Data Space of Hard Disk Drive S[%] | Power Consumption at Starting of Hard Disk Drive P[%] | Comprehensive Evaluation |
| --- | --- | --- | --- | --- | --- |
| Reference B | 18.9 | 100.0 | 100.0 | 100.0 | — |
| Example 2-1 | 18.5 | 99.3 | 104.2 | 98.7 | Excellent |
| Example 2-2 | 18.4 | 96.8 | 103.1 | 98.1 | Excellent |
| Example 2-3 | 18.4 | 91.0 | 101.9 | 99.7 | Excellent |
| Example 2-4 | 18.3 | 95.0 | 101.9 | 97.6 | Excellent |
| Example 2-5 | 18.3 | 89.1 | 100.6 | 99.4 | Excellent |
| Example 2-6 | 18.2 | 93.2 | 100.6 | 97.2 | Excellent |
| Example 2-7 | 18.1 | 99.0 | 100.6 | 95.1 | Excellent |
| Example 2-8 | 19.3 | 95.2 | 109.7 | 109.8 | Good |
| Example 2-9 | 19.17 | 97.9 | 119.5 | 116.3 | Good |
| Example 2-10 | 19.7 | 93.5 | 127.8 | 123.6 | Good |
| Example 2-11 | 19.05 | 77.0 | 134.0 | 136.3 | Good |
| Example 2-12 | 19.3 | 12.1 | 100.5 | 207.8 | Good |
| Example 2-13 | 18.7 | 96.5 | 105.4 | 101.8 | Good |
| Example 2-14 | 19.1 | 96.8 | 123.7 | 115.0 | Good |
| Example 2-15 | 19.6 | 67.9 | 125.8 | 133.0 | Good |
| Example 2-16 | 19.9 | 45.0 | 125.6 | 154.3 | Good |
| Example 2-17 | 20 | 12.3 | 102.2 | 218.5 | Good |
| Example 2-18 | 19.07 | 98.3 | 110.7 | 103.7 | Good |
| Example 2-19 | 18.85 | 95.6 | 107.9 | 103.0 | Good |
| Example 2-20 | 16.55 | 58.8 | 116.6 | 126.3 | Good |
| Example 2-21 | 19.25 | 16.1 | 102.2 | 202.5 | Good |
| Example 2-22 | 18.8 | 97.5 | 143.1 | 126.1 | Good |
| Example 2-23 | 19.3 | 95.3 | 101.9 | 103.4 | Good |
| Example 2-24 | 18.3 | 94.6 | 101.9 | 101.3 | Good |
| Example 2-25 | 19 | 62.0 | 102.2 | 125.3 | Good |
| Example 2-26 | 18.3 | 37.8 | 100.1 | 149.4 | Good |
| Example 2-27 | 18.5 | 67.8 | 121.4 | 131.1 | Good |
| Example 2-28 | 19.9 | 50.9 | 123.0 | 152.7 | Good |
| Example 2-29 | 19.8 | 95.3 | 148.2 | 133.1 | Good |
| Example 2-30 | 19.8 | 17.0 | 103.0 | 212.8 | Good |

TABLE 4

|  | Outer Diameter of Magnetic Disk 2Rd[mm] | Thickness of Magnetic Disk Td[mm] | Number of Magnetic Disks [sheet] | Outer Diameter of Spacer 2Rso[mm] | Inner Diameter of Spacer 2Rsi[mm] | Thickness of Spacer Ts[mm] | Outer Diameter of Contact Portion between Magnetic Disk and Spacer 2Rsso[m] |
| --- | --- | --- | --- | --- | --- | --- | --- |
| Comparative Example 2-1 | 97 | 0.5 | 10 | 32 | 25 | 1.6 | 31.9 |
| Comparative Example 2-3 | 97 | 0.4 | 10 | 39 | 25 | 1.6 | 38.9 |
| Comparative Example 2-4 | 97 | 0.35 | 11 | 43 | 25 | 1.5 | 42.8 |
| Comparative Example 2-5 | 97 | 0.3 | 11 | 47 | 25 | 1.5 | 46.9 |
| Comparative Example 2-6 | 97 | 0.45 | 10 | 43 | 25 | 1.6 | 42.8 |
| Comparative Example 2-7 | 97 | 0.4 | 11 | 50 | 25 | 1.4 | 49.9 |
| Comparative Example 2-8 | 97 | 0.35 | 12 | 55 | 25 | 1.4 | 54.8 |
| Comparative Example 2-9 | 97 | 0.3 | 13 | 59 | 25 | 1.2 | 58.9 |
| Comparative Example 2-10 | 97 | 0.3 | 14 | 62 | 25 | 1.1 | 61.8 |
| Comparative Example 2-11 | 97 | 0.3 | 15 | 65 | 25 | 1.1 | 64.9 |
| Comparative Example 2-12 | 97 | 0.3 | 16 | 67 | 25 | 1 | 66.6 |

TABLE 4-continued

| | Stacking Height of Magnetic Disks and Spacers T[mm] | Bending Amount at Outermost Peripheral Position of Magnetic Disk ωmax[%] | Data Space of Hard Disk Drive S[%] | Power Consumption at Starting of Hard Disk Drive P[%] | Comprehensive Evaluation |
|---|---|---|---|---|---|
| Comparative Example 2-1 | 19.4 | 103.0 | 111.7 | 110.1 | Poor |
| Comparative Example 2-3 | 18.4 | 103.6 | 104.2 | 96.6 | Poor |
| Comparative Example 2-4 | 18.85 | 103.0 | 109.3 | 100.9 | Poor |
| Comparative Example 2-5 | 18.3 | 102.5 | 103.4 | 98.6 | Poor |
| Comparative Example 2-6 | 18.9 | 62.3 | 99.4 | 114.0 | Poor |
| Comparative Example 2-7 | 18.4 | 45.0 | 98.7 | 128.1 | Poor |
| Comparative Example 2-8 | 19.6 | 37.8 | 98.4 | 146.3 | Poor |
| Comparative Example 2-9 | 18.3 | 34.0 | 97.9 | 154.3 | Poor |
| Comparative Example 2-10 | 18.5 | 24.7 | 97.9 | 176.3 | Poor |
| Comparative Example 2-11 | 19.9 | 17.0 | 96.6 | 209.4 | Poor |
| Comparative Example 2-12 | 19.8 | 13.2 | 96.8 | 227.5 | Poor |

Figure 9:
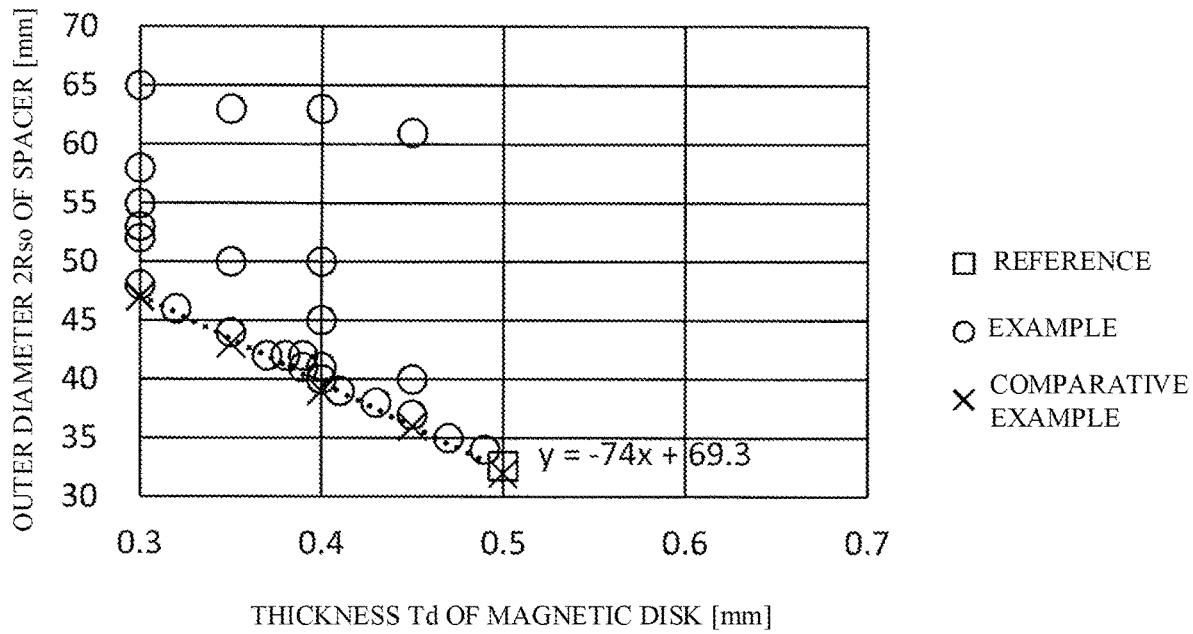
FIG. 9 is a graph illustrating a good/poor relationship between an outer diameter of a spacer and a bending amount of a magnetic disk for each thickness of a magnetic disk with respect to magnetic disks according to other Examples.
Figure 10:
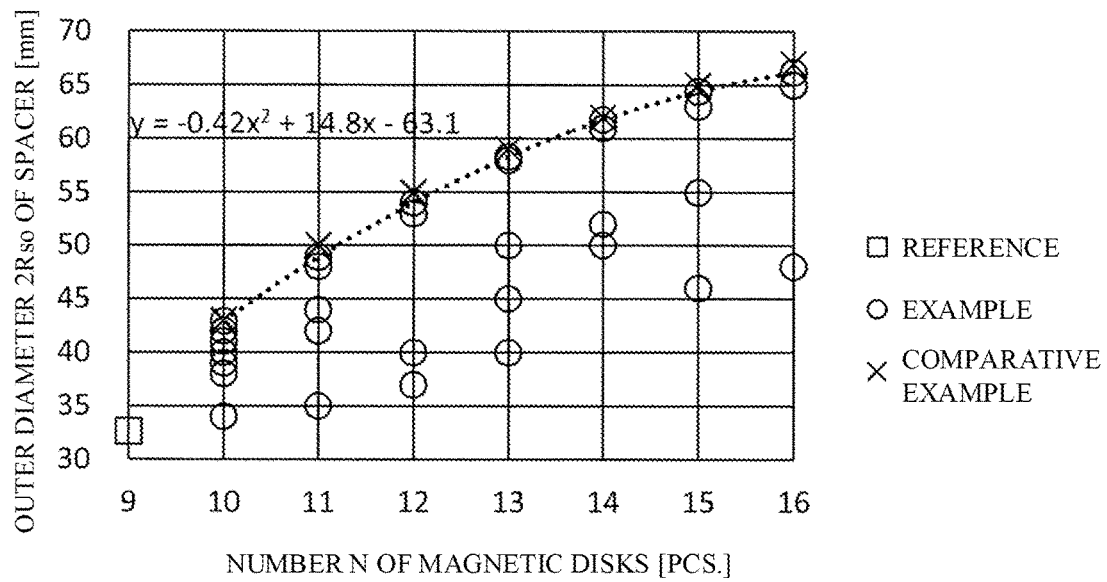
FIG. 10 is a graph illustrating a good/poor relationship between an outer diameter of a spacer and data space of a magnetic disk for each number of magnetic disks with respect to magnetic disks according to the other Examples.

In Examples 2-1 to 2-30, the bending amounts of magnetic disks are less than or equal to that of the reference and sizes of data spaces in hard disk drives are greater than or equal to that of the reference. In FIG. 9 in which the abscissa represents the thickness Td of a magnetic disk and the ordinate represents an outer diameter 2Rso of a spacer, an example in which the bending amount of a magnetic disk is greater than or equal to that of the reference is indicated as a good case (by a circular mark ○), a comparative example in which the bending amount of a magnetic disk is less than that of the reference is indicated as a poor case (by an X mark x), and the reference B is indicated by a square mark (□). In FIG. 10 in which the abscissa represents the number N of magnetic disks and the ordinate represents an outer diameter 2Rso of a spacer, an example in which the size of data space in a hard disk drive is greater than or equal to that of the reference is indicated by a circular mark (○), a comparative example in which the size of data space is less than that of the reference is indicated by an X mark (x), and the reference B is indicated by a square mark (□).

From the above results, it is revealed that, in the case of a 3.5-inch hard disk drive having magnetic disks formed of glass substrates mounted thereon, when the thickness Td of each magnetic disk is 0.3 to 0.49 mm, the number N of magnetic disks is 10 to 16, and the outer diameter 2Rso of each spacer satisfies $2Rso \geq -74Td+69.3$ and $2Rso \leq -0.42N^2+14.8N-63.1$, the bending amount of a magnetic disk becomes less than or equal to that of the reference and the size of data space becomes greater than or equal to that of the reference.

More preferably, it is desirable that a distance of 1.6 mm or more between magnetic disks that is sufficient to cause a head stack assembly for HAMR in which a laser element is mounted or a head stack assembly for MAMR in which a microwave generating element is mounted to operate be secured and power consumption at the starting of the hard disk drive be less than or equal to that of the reference. Examples 2-1 to 2-7 that are indicated as "Excellent" in the column "Comprehensive Evaluation" in Table 3 satisfy the requirements.

In Comparative Examples 2-1 and 2-3 to 2-5, the bending amounts of magnetic disks are greater than that of the reference and the impact resistance and the fluttering resistance are inferior to those of the reference, as shown in Table 4. In Comparative Examples 2-6 to 2-12, data spaces in hard disk drives are smaller than that of the reference and higher capacity thus cannot be achieved.

Note that, in both cases of an aluminum alloy substrate and a glass substrate employed as a magnetic disk, a range in which the bending amount of a magnetic disk is less than or equal to that of the reference and the size of data space is greater than or equal to that of the reference is as follows.

Such a range is a range in which the hard disk drive is a 3.5-inch hard disk drive having magnetic disks formed of aluminum alloy substrates or glass substrates mounted thereon, the thickness Td of each magnetic disk is 0.3 to 0.49 mm, the number N of magnetic disks is 10 to 16, and the outer diameter 2Rso of each spacer satisfies $2Rso \geq -60Td+70$ and $2Rso \leq -0.5N^2+16.5N-73$.

As described above, it is revealed that setting the outer diameter 2Rso of the spacers 80 to the above-described value enables, without increasing the bending amount of the magnetic disks 30, that is, with the impact resistance and the fluttering resistance of the hard disk drive 100 maintained, the data space in the hard disk drive 100 to be increased and a 3.5-inch hard disk drive 100 with high capacity to be provided. In addition, setting the outer diameter 2Rso of the spacers 80 and the thickness Td of and the number N of the magnetic disks 30 to the above-described values enables the hard disk drive 100 that excels in low power consumption at starting to be provided.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2020-192623, filed on Nov. 19, 2020, the entire disclosure of which is incorporated by reference herein.

REFERENCE SIGNS LIST

10 Housing
20 Base
30 Magnetic disk
31 Aluminum alloy substrate
40 Head stack assembly
41 Arm
42 Head
50 Voice coil motor
60 Ramp load
70 Clamp
80 Spacer
81, 82 Chamfered portion
83 Contact portion
90 Hub
91 Small-diameter portion
92 Large-diameter portion
100 Hard disk drive
D Depth
W Width
H Height
N The number of magnetic disks
Z Rotational axis
AX Region
ωmax Bending amount
Rd Outer radius
Td, Ts Thickness
T Stacking height
Rsi, Rssi, Rddi Inner radius
Rso, Rsso, Rddo Outer radius

The invention claimed is:

1. A hard disk drive, the hard disk drive being a 3.5-inch hard disk drive on which a magnetic disk formed of an aluminum alloy substrate is mounted, wherein
a thickness Td of each of magnetic disks that are arranged in a stacked manner is 0.3 mm or more and 0.6 mm or less, a number N of the magnetic disks is 10 or more and 16 or less, and an outer diameter 2Rso of a spacer that is arranged between the magnetic disks is 35 mm or more and 65 mm or less, and
the outer diameter 2Rso (mm) of the spacer satisfies $2Rso \geq -60Td+70$ and $2Rso \leq -0.5N^2+16.5N-73$.

2. The hard disk drive according to claim 1, wherein the thickness Td of the magnetic disk is 0.47 mm or more and 0.55 mm or less, the number N of the magnetic disks is 10, the outer diameter 2Rso of the spacer is 38 mm or more and 42 mm or less, a thickness of the spacer is 1.5 mm or more, and the hard disk drive excels in low power consumption at starting.

3. The hard disk drive according to claim 2, wherein the hard disk drive performs recording by heat assisted magnetic recording or microwave assisted magnetic recording.

4. The hard disk drive according to claim 1, wherein the hard disk drive performs recording by heat assisted magnetic recording or microwave assisted magnetic recording.

5. A hard disk drive, the hard disk drive being a 3.5-inch hard disk drive on which a magnetic disk formed of a glass substrate is mounted, wherein
a thickness Td of each of magnetic disks that are arranged in a stacked manner is 0.3 mm or more and 0.6 mm or less, a number N of the magnetic disks is 10 or more and 16 or less, and an outer diameter 2Rso of a spacer that is arranged between the magnetic disks is 35 mm or more and 65 mm or less, and
the thickness Td of the magnetic disk is 0.3 mm or more and 0.49 mm or less, and the outer diameter 2Rso (mm) of the spacer satisfies $2Rso \geq -74Td+69.3$ and $2Rso \leq -0.42N^2+14.8N-63.1$.

6. The hard disk drive according to claim 5, wherein the thickness Td of the magnetic disk is 0.37 mm or more and 0.41 mm or less, the number N of the magnetic disks is 10, the outer diameter 2Rso of the spacer is 39 mm or more and 42 mm or less, a thickness of the spacer is 1.6 mm or more, and the hard disk drive excels in low power consumption at starting.

7. The hard disk drive according to claim 6, wherein the hard disk drive performs recording by heat assisted magnetic recording or microwave assisted magnetic recording.

8. The hard disk drive according to claim 5, wherein the hard disk drive performs recording by heat assisted magnetic recording or microwave assisted magnetic recording.

* * * * *